US012759316B2

(12) United States Patent
Deguchi et al.

(10) Patent No.: US 12,759,316 B2
(45) Date of Patent: Oct. 13, 2026

(54) RECORDING APPARATUS AND DRYING METHOD FOR RECORDING APPARATUS

(71) Applicant: CANON KABUSHIKI KAISHA, Tokyo (JP)

(72) Inventors: Kyosuke Deguchi, Kanagawa (JP); Yohei Kohashi, Kanagawa (JP); Yutaro Nakatsuka, Kanagawa (JP); Yoichi Takada, Kanagawa (JP); Kenji Shinjo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 18/679,208

(22) Filed: May 30, 2024

(65) Prior Publication Data

US 2024/0399770 A1 Dec. 5, 2024

(30) Foreign Application Priority Data

Jun. 2, 2023 (JP) ................................ 2023-091752

(51) Int. Cl.
*B41J 11/00* (2006.01)

(52) U.S. Cl.
CPC ............................... *B41J 11/00222* (2021.01)

(58) Field of Classification Search
CPC . B41J 11/002; B41J 11/0022; B41J 11/00222; B41M 7/009
USPC .......................................................... 347/102
See application file for complete search history.

(56) References Cited

U.S. PATENT DOCUMENTS

2010/0110156 A1 5/2010 Hara et al. .............. F26B 13/00
2017/0261895 A1* 9/2017 Ramackers ......... B41F 23/0466
2021/0146680 A1* 5/2021 Dollevoet ............ B41J 11/0022
2021/0291562 A1 9/2021 Hiramatsu et al. ...... B41J 11/00
2022/0402278 A1* 12/2022 Maida .................. B41J 11/0022

FOREIGN PATENT DOCUMENTS

JP 2001-121058 5/2001
JP 2014-121853 7/2014
JP 2022069114 A * 5/2022 .......... B41J 11/0022

OTHER PUBLICATIONS

Machine translation of JP 2022069114 A (Year: 2025).*
Extended European Search Report dated Oct. 28, 2024 in counterpart EP Application No. 24178655.7.

* cited by examiner

*Primary Examiner* — Stephen D Meier
*Assistant Examiner* — Thomas Ray Knief
(74) *Attorney, Agent, or Firm* — Venable LLP

(57) ABSTRACT

A recording apparatus includes a recording portion, a first air blowing portion comprising a plurality of first nozzle holes, a second air blowing portion comprising a plurality of second nozzle holes, and provided to be adjacent to the first air blowing portion on a downstream side in a conveyance direction, and a control portion configured to control the first air blowing portion and the second air blowing portion such that a first air velocity in the plurality of first nozzle holes is lower than a second air velocity in the plurality of second nozzle holes, and a ratio of a first total air amount, which is a total air amount per unit time blown from the plurality of first nozzle holes, and a second total air amount, which is a total air amount per unit time blown from the plurality of second nozzle holes, is within a predetermined range.

13 Claims, 25 Drawing Sheets

Table 1

| AIRFLOW DUCT | NOZZLE PATTERN IMAGE | AIR VELOCITY V [m/sec] | TOTAL NOZZLE HOLE CROSS-SECTIONAL AREA d PER UNIT AREA [$mm^2/cm^2$] | TOTAL AIR AMOUNT f PER UNIT AREA [$m \cdot mm^2/(sec \cdot cm^2)$] | NOZZLE HOLE DIAMETER R [mm] | NUMBER n OF NOZZLE HOLES PER UNIT AREA [$1/cm^2$] |
|---|---|---|---|---|---|---|
| 431a |  | 10 | 6.6 | 66 | 3.5 | 0.69 |
| 431b |  | 30 | 2.2 | 65 | 2.0 | 0.69 |
| 431c |  | 30 | 2.2 | 65 | 2.0 | 0.69 |

Table 2

| AIRFLOW DUCT | NOZZLE PATTERN IMAGE | AIR VELOCITY V [m/sec] | TOTAL NOZZLE HOLE CROSS-SECTIONAL AREA d PER UNIT AREA [$mm^2/cm^2$] | TOTAL AIR AMOUNT f PER UNIT AREA [$m \cdot mm^2/(sec \cdot cm^2)$] | NOZZLE HOLE DIAMETER R [mm] | NUMBER n OF NOZZLE HOLES PER UNIT AREA [$1/cm^2$] |
| --- | --- | --- | --- | --- | --- | --- |
| 431a |  | 10 | 6.6 | 66 | 3.5 | 0.69 |
| 431b |  | 10 | 6.6 | 66 | 3.5 | 0.69 |
| 431c |  | 30 | 2.2 | 65 | 2.0 | 0.69 |

Table 3

| AIRFLOW DUCT | NOZZLE PATTERN IMAGE | AIR VELOCITY V [m/sec] | TOTAL NOZZLE HOLE CROSS-SECTIONAL AREA d PER UNIT AREA [$mm^2/cm^2$] | TOTAL AIR AMOUNT f PER UNIT AREA [$m \cdot mm^2/(sec \cdot cm^2)$] | NOZZLE HOLE DIAMETER R [mm] | NUMBER n OF NOZZLE HOLES PER UNIT AREA [$1/cm^2$] |
|---|---|---|---|---|---|---|
| 431a |  | 10 | 2.9 | 29 | 2.3 | 0.69 |
| 431b |  | 12 | 2.2 | 26 | 2.0 | 0.69 |
| 431c |  | 12 | 2.2 | 26 | 2.0 | 0.69 |

Table 4

| AIRFLOW DUCT | NOZZLE PATTERN IMAGE | AIR VELOCITY V [m/sec] | TOTAL NOZZLE HOLE CROSS-SECTIONAL AREA d PER UNIT AREA [$mm^2/cm^2$] | TOTAL AIR AMOUNT f PER UNIT AREA [$m \cdot mm^2/(sec \cdot cm^2)$] | NOZZLE HOLE DIAMETER R [mm] | NUMBER n OF NOZZLE HOLES PER UNIT AREA [$1/cm^2$] |
|---|---|---|---|---|---|---|
| 431a |  | 10 | 9.6 | 96 | 4.2 | 0.69 |
| 431b |  | 30 | 2.2 | 65 | 2.0 | 0.69 |
| 431c |  | 30 | 2.2 | 65 | 2.0 | 0.69 |

Table 5

| AIRFLOW DUCT | NOZZLE PATTERN IMAGE | AIR VELOCITY V [m/sec] | TOTAL NOZZLE HOLE CROSS-SECTIONAL AREA d PER UNIT AREA [$mm^2/cm^2$] | TOTAL AIR AMOUNT f PER UNIT AREA [$m \cdot mm^2/(sec \cdot cm^2)$] | NOZZLE HOLE DIAMETER R [mm] | NUMBER n OF NOZZLE HOLES PER UNIT AREA [$1/cm^2$] |
|---|---|---|---|---|---|---|
| 431a |  | 10 | 3.7 | 37 | 2.6 | 0.69 |
| 431b |  | 12 | 2.2 | 26 | 2.0 | 0.69 |
| 431c |  | 12 | 2.2 | 26 | 2.0 | 0.69 |

Table 6

| AIRFLOW DUCT | NOZZLE PATTERN IMAGE | AIR VELOCITY V [m/sec] | TOTAL NOZZLE HOLE CROSS-SECTIONAL AREA d PER UNIT AREA [$mm^2/cm^2$] | TOTAL AIR AMOUNT f PER UNIT AREA [$m \cdot mm^2/(sec \cdot cm^2)$] | NOZZLE HOLE DIAMETER R [mm] | NUMBER n OF NOZZLE HOLES PER UNIT AREA [$1/cm^2$] |
|---|---|---|---|---|---|---|
| 431a |  | 10 | 4.3 | 43 | 2.8 | 0.69 |
| 431b |  | 30 | 2.2 | 65 | 2.0 | 0.69 |
| 431c |  | 30 | 2.2 | 65 | 2.0 | 0.69 |

Table 7

| AIRFLOW DUCT | NOZZLE PATTERN IMAGE | AIR VELOCITY V [m/sec] | TOTAL NOZZLE HOLE CROSS-SECTIONAL AREA d PER UNIT AREA [$mm^2/cm^2$] | TOTAL AIR AMOUNT f PER UNIT AREA [$m \cdot mm^2/(sec \cdot cm^2)$] | NOZZLE HOLE DIAMETER R [mm] | NUMBER n OF NOZZLE HOLES PER UNIT AREA [$1/cm^2$] | NOZZLE DISPLACEMENT |
|---|---|---|---|---|---|---|---|
| 431a |  | 10 | 6.6 | 66 | 3.5 | 0.69 | A = 1.0 |
| 431b |  | 30 | 2.2 | 65 | 2.0 | 0.69 | REGULAR NOZZLE SPACING |
| 431c |  | 30 | 2.2 | 65 | 2.0 | 0.69 | REGULAR NOZZLE SPACING |

Table 8

| AIRFLOW DUCT | NOZZLE PATTERN IMAGE | AIR VELOCITY V [m/sec] | TOTAL NOZZLE HOLE CROSS-SECTIONAL AREA d PER UNIT AREA [$mm^2/cm^2$] | TOTAL AIR AMOUNT f PER UNIT AREA [$m \cdot mm^2/(sec \cdot cm^2)$] | NOZZLE HOLE DIAMETER R [mm] | NUMBER n OF NOZZLE HOLES PER UNIT AREA [$1/cm^2$] | NOZZLE DISPLACEMENT |
|---|---|---|---|---|---|---|---|
| 431a |  | 10 | 6.6 | 66 | 3.5 | 0.69 | A=0.8 |
| 431b |  | 30 | 2.2 | 65 | 2.0 | 0.69 | REGULAR NOZZLE SPACING |
| 431c |  | 30 | 2.2 | 65 | 2.0 | 0.69 | REGULAR NOZZLE SPACING |

Table 9

| AIRFLOW DUCT | NOZZLE PATTERN IMAGE | AIR VELOCITY V [m/sec] | TOTAL NOZZLE HOLE CROSS-SECTIONAL AREA d PER UNIT AREA [$mm^2/cm^2$] | TOTAL AIR AMOUNT f PER UNIT AREA [$m \cdot mm^2/(sec \cdot cm^2)$] | NOZZLE HOLE DIAMETER R [mm] | NUMBER n OF NOZZLE HOLES PER UNIT AREA [$1/cm^2$] | NOZZLE DISPLACEMENT |
|---|---|---|---|---|---|---|---|
| 431a |  | 10 | 6.6 | 66 | 3.5 | 0.69 | A = 1.3 |
| 431b |  | 30 | 2.2 | 65 | 2.0 | 0.69 | REGULAR NOZZLE SPACING |
| 431c |  | 30 | 2.2 | 65 | 2.0 | 0.69 | REGULAR NOZZLE SPACING |

Table 10

| AIRFLOW DUCT | NOZZLE PATTERN IMAGE | AIR VELOCITY V [m/sec] | TOTAL NOZZLE HOLE CROSS-SECTIONAL AREA d PER UNIT AREA [$mm^2/cm^2$] | TOTAL AIR AMOUNT f PER UNIT AREA [$m \cdot mm^2/(sec \cdot cm^2)$] | NOZZLE HOLE DIAMETER R [mm] | NUMBER n OF NOZZLE HOLES PER UNIT AREA [$1/cm^2$] |
|---|---|---|---|---|---|---|
| 431a |  | 10 | 6.6 | 66 | 2.0 | 2.1 |
| 431b |  | 30 | 2.2 | 65 | 2.0 | 0.69 |
| 431c |  | 30 | 2.2 | 65 | 2.0 | 0.69 |

Table 11

| AIRFLOW DUCT | NOZZLE PATTERN IMAGE | AIR VELOCITY V [m/sec] | TOTAL NOZZLE HOLE CROSS-SECTIONAL AREA d PER UNIT AREA [$mm^2/cm^2$] | TOTAL AIR AMOUNT f PER UNIT AREA [$m \cdot mm^2/(sec \cdot cm^2)$] | NOZZLE HOLE DIAMETER R [mm] | NUMBER n OF NOZZLE HOLES PER UNIT AREA [$1/cm^2$] |
|---|---|---|---|---|---|---|
| 431a |  | 10 | 6.6 | 66 | 2.0 | 2.1 |
| 431b |  | 10 | 6.6 | 66 | 2.0 | 2.1 |
| 431c |  | 30 | 2.2 | 65 | 2.0 | 0.69 |

Table 12

| AIRFLOW DUCT | NOZZLE PATTERN IMAGE | AIR VELOCITY V [m/sec] | TOTAL NOZZLE HOLE CROSS-SECTIONAL AREA d PER UNIT AREA [$mm^2/cm^2$] | TOTAL AIR AMOUNT f PER UNIT AREA [$m \cdot mm^2/(sec \cdot cm^2)$] | NOZZLE HOLE DIAMETER R [mm] | NUMBER n OF NOZZLE HOLES PER UNIT AREA [$1/cm^2$] |
|---|---|---|---|---|---|---|
| 431a |  | 10 | 2.6 | 26 | 2.0 | 0.83 |
| 431b |  | 12 | 2.2 | 26 | 2.0 | 0.69 |
| 431c |  | 12 | 2.2 | 26 | 2.0 | 0.69 |

Table 13

| AIRFLOW DUCT | NOZZLE PATTERN IMAGE | AIR VELOCITY V [m/sec] | TOTAL NOZZLE HOLE CROSS-SECTIONAL AREA d PER UNIT AREA [$mm^2/cm^2$] | TOTAL AIR AMOUNT f PER UNIT AREA [$m \cdot mm^2/(sec \cdot cm^2)$] | NOZZLE HOLE DIAMETER R [mm] | NUMBER n OF NOZZLE HOLES PER UNIT AREA [$1/cm^2$] |
|---|---|---|---|---|---|---|
| 431a |  | 10 | 9.7 | 97 | 2.0 | 3.1 |
| 431b |  | 30 | 2.2 | 65 | 2.0 | 0.69 |
| 431c |  | 30 | 2.2 | 65 | 2.0 | 0.69 |

Table 14

| AIRFLOW DUCT | NOZZLE PATTERN IMAGE | AIR VELOCITY V [m/sec] | TOTAL NOZZLE HOLE CROSS-SECTIONAL AREA d PER UNIT AREA [$mm^2/cm^2$] | TOTAL AIR AMOUNT f PER UNIT AREA [$m \cdot mm^2/(sec \cdot cm^2)$] | NOZZLE HOLE DIAMETER R [mm] | NUMBER n OF NOZZLE HOLES PER UNIT AREA [$1/cm^2$] |
|---|---|---|---|---|---|---|
| 431a |  | 10 | 3.8 | 38 | 2.0 | 1.2 |
| 431b |  | 12 | 2.2 | 65 | 2.0 | 0.69 |
| 431c |  | 12 | 2.2 | 65 | 2.0 | 0.69 |

Table 15

| AIRFLOW DUCT | NOZZLE PATTERN IMAGE | AIR VELOCITY V [m/sec] | TOTAL NOZZLE HOLE CROSS-SECTIONAL AREA d PER UNIT AREA [$mm^2/cm^2$] | TOTAL AIR AMOUNT f PER UNIT AREA [$m \cdot mm^2/(sec \cdot cm^2)$] | NOZZLE HOLE DIAMETER R [mm] | NUMBER n OF NOZZLE HOLES PER UNIT AREA [$1/cm^2$] |
|---|---|---|---|---|---|---|
| 431a |  | 10 | 4.4 | 44 | 2.0 | 1.4 |
| 431b |  | 30 | 2.2 | 65 | 2.0 | 0.69 |
| 431c |  | 30 | 2.2 | 65 | 2.0 | 0.69 |

RECORDING APPARATUS AND DRYING METHOD FOR RECORDING APPARATUS

BACKGROUND OF THE INVENTION

Field of the Invention

The present invention relates to a recording apparatus.

Description of the Related Art

As a recording apparatus that performs a recording operation by applying a liquid to a recording medium, a recording apparatus having a drying portion that blows air onto the recording medium to dry and fix the liquid is widely used. With such a recording apparatus, the velocity and amount of air blown by the drying portion are controlled in order to suppress streaking of liquid on the recording medium due to blown air (hereinafter referred to as air blow streaking) as well as to suppress drying unevenness and the like. For example, in order to efficiently perform drying while suppressing air blow streaking of the liquid, the drying portion can be controlled so as to first perform drying with low velocity air and then accelerate drying with higher velocity air.

Japanese Patent Application Publication No. 2001-121058 discloses a configuration in which the drying operation is efficiently executed while suppressing air blow streaking, by controlling the distance between the recording medium and the distal end surfaces of the nozzles of dryers that blow air, in addition to controlling the air velocity. In the above-described configuration, the dryers and the conveyance path of the recording medium are configured such that the distance between the distal end surfaces of the nozzles and the recording medium gradually decreases as approaching the downstream side in the conveyance direction of the recording medium.

SUMMARY OF THE INVENTION

However, in the above-described configuration, the difference in distance between the distal end surfaces of the nozzles and the recording medium in the conveyance direction results in a difference in the pressure of the space between the nozzles and the recording medium in the conveyance direction. This means that the air blown from one dryer can enter the space between the nozzle of another dryer and the recording medium and disturb the airflow. If air is not blown toward the recording medium from the dryers notwithstanding intention due to the airflow being disturbed, the liquid may not be dried uniformly in the drying process, and drying unevenness may occur.

The present invention has been made in view of the above-described issues, and an object thereof is to appropriately dry a recording medium to which a liquid has been applied.

In order to achieve the above-described object, a recording apparatus of the present invention includes:

- a recording portion configured to apply a liquid composition to a recording medium and record an image;
- a first air blowing portion having a plurality of first nozzle holes of which total cross-sectional area is a first total cross-sectional area, and configured to blow air toward the recording medium through the plurality of first nozzle holes;
- a second air blowing portion having a plurality of second nozzle holes of which total cross-sectional area is a second total cross-sectional area smaller than the first total cross-sectional area, and configured to blow air toward the recording medium through the plurality of second nozzle holes, and moreover provided within a same space as the first air blowing portion so as to be adjacent to the first air blowing portion on a downstream side in a conveyance direction of the recording medium; and
- a control portion configured to control the first air blowing portion and the second air blowing portion such that a first air velocity in the plurality of first nozzle holes of the first air blowing portion is lower than a second air velocity in the plurality of second nozzle holes of the second air blowing portion, and a ratio of a first total air amount, which is a total air amount per unit time blown from the plurality of first nozzle holes, and a second total air amount, which is a total air amount per unit time blown from the plurality of second nozzle holes, is within a predetermined range.

Additionally, in order to achieve the above-described object, drying method for a recording apparatus that blows air toward a recording medium with the recording apparatus and dries the recording medium, the recording apparatus including a recording portion configured to apply a liquid composition to the recording medium and record an image, a first air blowing portion having a plurality of first nozzle holes of which total cross-sectional area is a first total cross-sectional area and configured to blow air toward the recording medium through the plurality of first nozzle holes, and a second air blowing portion having a plurality of second nozzle holes of which total cross-sectional area is a second total cross-sectional area smaller than the first total cross-sectional area, and configured to blow air toward the recording medium through the plurality of second nozzle holes and moreover provided within a same space as the first air blowing portion so as to be adjacent to the first air blowing portion on a downstream side in a conveyance direction of the recording medium, the method including:

- blowing air toward the recording medium from the first air blowing portion and the second air blowing portion such that a first air velocity in the plurality of first nozzle holes of the first air blowing portion is lower than a second air velocity in the plurality of second nozzle holes of the second air blowing portion, and a ratio of a first total air amount, which is a total air amount per unit time blown from the plurality of first nozzle holes, and a second total air amount, which is a total air amount per unit time blown from the plurality of second nozzle holes, is within a predetermined range.

According to the present invention, a recording medium to which a liquid has been applied can be appropriately dried.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

First Embodiment

Recording Apparatus

First, the configuration of a recording apparatus 1 according to a first embodiment of the present invention will be described. The recording apparatus 1 is a high-speed line printer that uses a sheet S, which is a continuous sheet wound in a roll, as a recording medium. Hereinafter, description will be given with the up-down direction of the recording apparatus 1 in FIG. 1 defined as the vertical direction (Z direction), the left-right direction defined as the longitudinal direction (X direction), and the depth direction of the page defined as the width direction (Y direction). The width direction is the width direction of the recording medium orthogonal to the conveyance direction of the recording medium.

Figure 1:
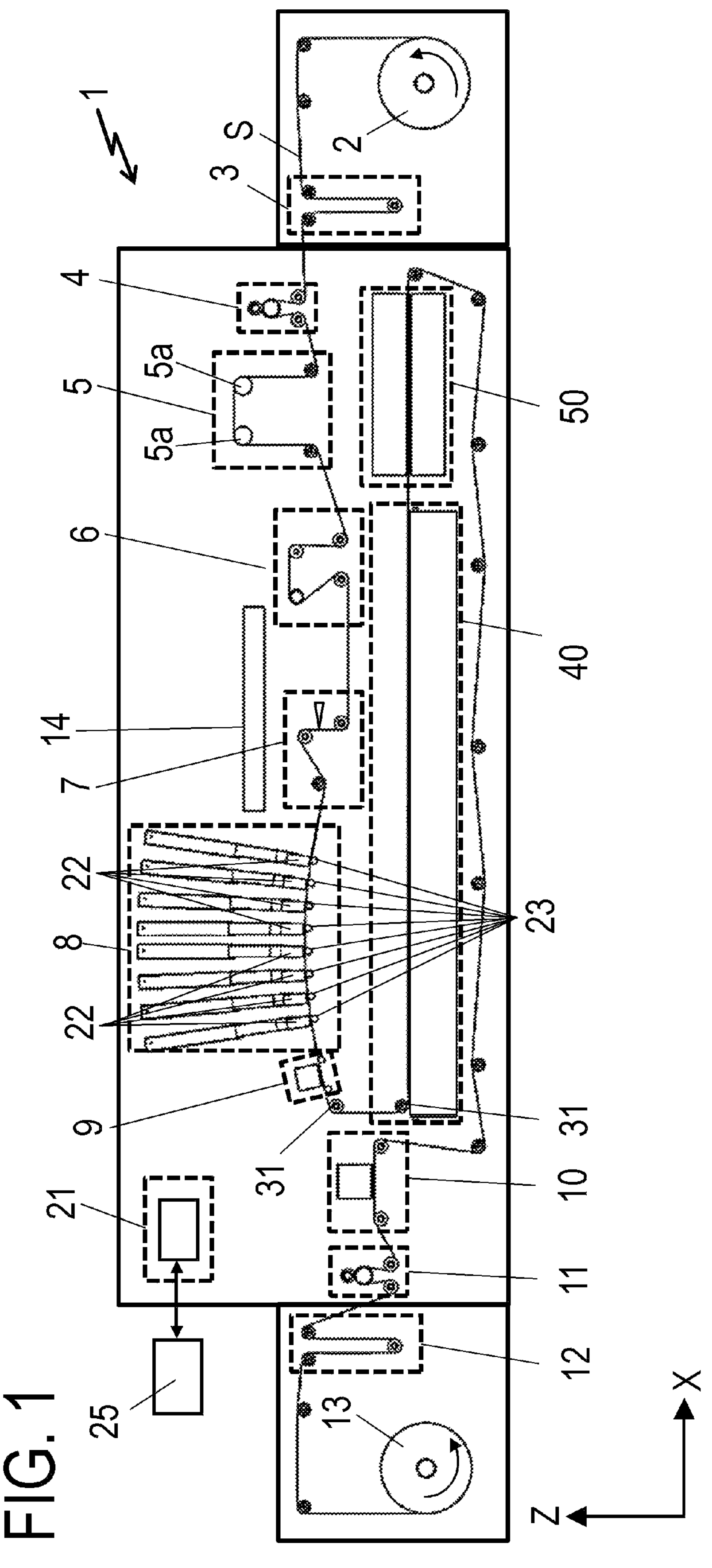
FIG. 1 is a schematic cross-sectional view showing an internal configuration of a recording apparatus according to a first embodiment.

FIG. 1 is a schematic cross-sectional view showing the internal configuration of the recording apparatus 1. A feed roll portion 2, a first dancer portion 3, a first main conveyance portion 4, a meandering correction portion 5, a conveyance detection portion 6, a mark sensor portion 7, a recording portion 8, and a first scanner portion 9 are provided inside the recording apparatus 1 of the first embodiment. A drying portion 40, a cooling portion 50, a second scanner portion 10, a second main conveyance portion 11, a second dancer portion 12, a take-up roll portion 13, and a maintenance portion 14 are further provided inside the recording apparatus 1. The sheet S is conveyed along a sheet conveyance path shown by a solid line in FIG. 1, and is processed by each unit.

The air blow streaking suppression effect of the instant invention is particularly effective in the case where the recording medium is a non-absorptive medium. This is because air blow streaking tends to particularly be an issue when blowing air to dry a liquid composition applied to a recording medium that is non-absorptive. In the case where such a recording medium is used, a configuration in which drying is first performed with low velocity air such that air blow streaking of the liquid composition does not occur and is then accelerated with higher velocity air is favorable in order to suppress air blow streaking. Examples of non-absorbent media include PET, PVC, PE, and PP, but are not particularly limited thereto.

The feed roll portion 2 is a unit for holding and supplying a continuous sheet wound in a roll. The feed roll portion 2 houses a feed roll and draws out and supplies the sheet S from the feed roll. Note that the number of rolls that can be housed is not limited to one, and the feed roll portion 2 may be configured to house two rolls or three or more rolls, and selectively draw out and supply the sheet S.

The first dancer portion 3 is a unit for applying a constant tension to the sheet S between the take-up roll portion 2 and the first main conveyance portion 4. In the first dancer portion 3, tension is applied to the sheet S by tensioning means not shown.

The first main conveyance portion 4 feeds the sheet S to the meandering correction portion 5, the conveyance detection portion 6, the mark sensor portion 7, the recording portion 8, the first scanner portion 9, the drying portion 40, the cooling portion 50, and the second scanner portion 10 that are disposed in the stated order along the conveyance path of the sheet S. Also, the first main conveyance portion 4 is a unit for applying tension to the sheet S together with the second main conveyance portion 11. The first main conveyance portion 4 rotates as a result of a motor (not shown) being driven, and performs tensioning and conveyance of the sheet S.

The conveyance path of the sheet S is constituted by various units, guide rollers provided between the units, or the like, and the sheet S is conveyed along the conveyance path while being guided by the guide rollers. Also, the conveyance path is a path that is formed by connecting the peripheral surfaces of the rollers and the tangential lines of rollers that are adjacent to each other, and is the general path along which the sheet S passes through the recording apparatus 1.

The meandering correction portion 5 is a unit for correcting widthwise meandering of the sheet during tensioning and conveyance of the sheet S. The meandering correction portion 5 includes a meandering correction roller **5*a* and a meandering detection sensor not shown that detects meandering of the sheet S. The meandering correction roller 5*a* is capable of changing the inclination of the sheet S by a motor not shown, and performs meandering correction of the sheet S on the basis of measurement by the meandering detection sensor. At this time, the meandering correction function can be enhanced, due to the sheet S winding on the meandering correction roller 5*a***.

The conveyance detection portion 6 is a unit for detecting tension, when tensioning and conveying the sheet S between the first main conveyance portion 4 and the second main conveyance portion 11. Also, the conveyance detection portion 6 is a unit for detecting the speed of the sheet S, in order to control the image formation timing of the recording portion 8.

The mark sensor portion 7 is a unit for detecting marks printed on the sheet S in advance, in order to control the image formation timing of the recording portion 8.

The recording portion 8 is a sheet processing portion that forms an image by applying a liquid composition to the conveyed sheet S with a plurality of recording heads 22 from above with respect to the sheet S. The conveyance path in the recording portion 8 is formed by a plurality of guide rollers 23 disposed in a circular arc shape that is convex upward, and clearance from the recording heads 22 is ensured due to a constant tension being applied to the sheet S.

Inside the recording apparatus 1, the plurality of recording heads 22 are arranged in the conveyance direction of the sheet S. In the first embodiment, the recording apparatus 1 has line-type recording heads that support W (white) ink and a reaction solution as the recording heads 22. The type and number of colors and the number of recording heads 22 is not limited to the configuration shown in FIG. 1. Examples of inkjet methods that can be employed include a method using heat-generating elements, a method using piezo elements, a method using electrostatic elements, and a method using MEMS elements. Ink is supplied from an ink tank not shown to the recording heads 22 via respective ink tubes. Also, in the first embodiment, a configuration is adopted in which a liquid composition consisting of ink and a reaction solution is applied to the sheet S using inkjet heads, but the method of applying a liquid composition to a sheet with the recording portion 8 is not limited thereto.

Figure 2:
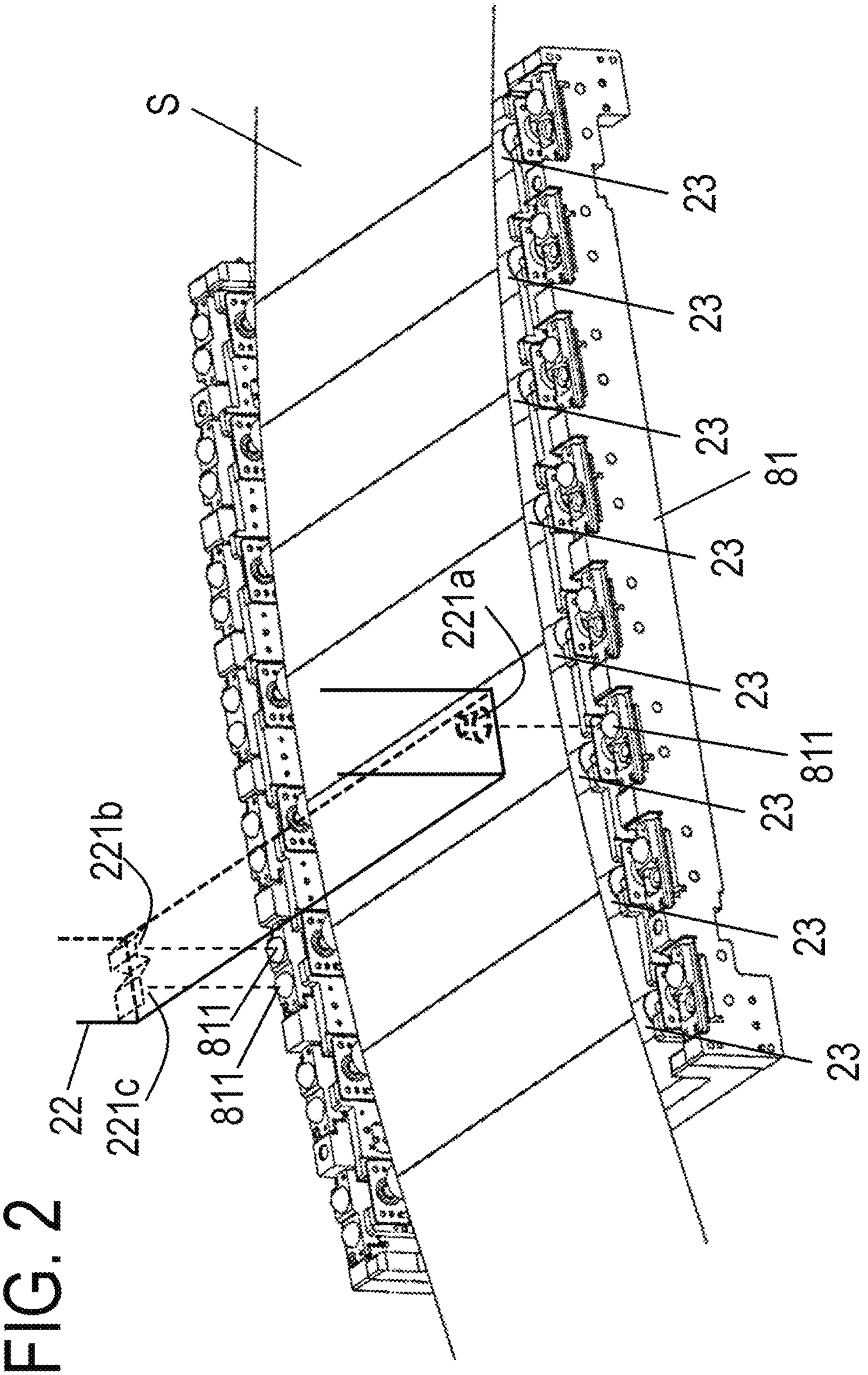
FIG. 2 is a perspective view of a sheet conveyance portion casing of a recording portion according to the first embodiment.

Also, the recording portion 8 has a conveyance portion casing 81 that is provided with a plurality of positioning members 811 for positioning the recording heads 22. FIG. 2 is a perspective view showing the conveyance portion casing 81 of the recording portion 8 in detail. The positioning members 811 are provided one on the near side and two on the far side in correspondence with one recording head 22 so as to sandwich the sheet S in the width direction of the sheet S. Also, the recording heads 22 are each provided with positioned portions 221*a*, 221*b*, and 221*c* corresponding to the positioning members 811.

Figure 3:
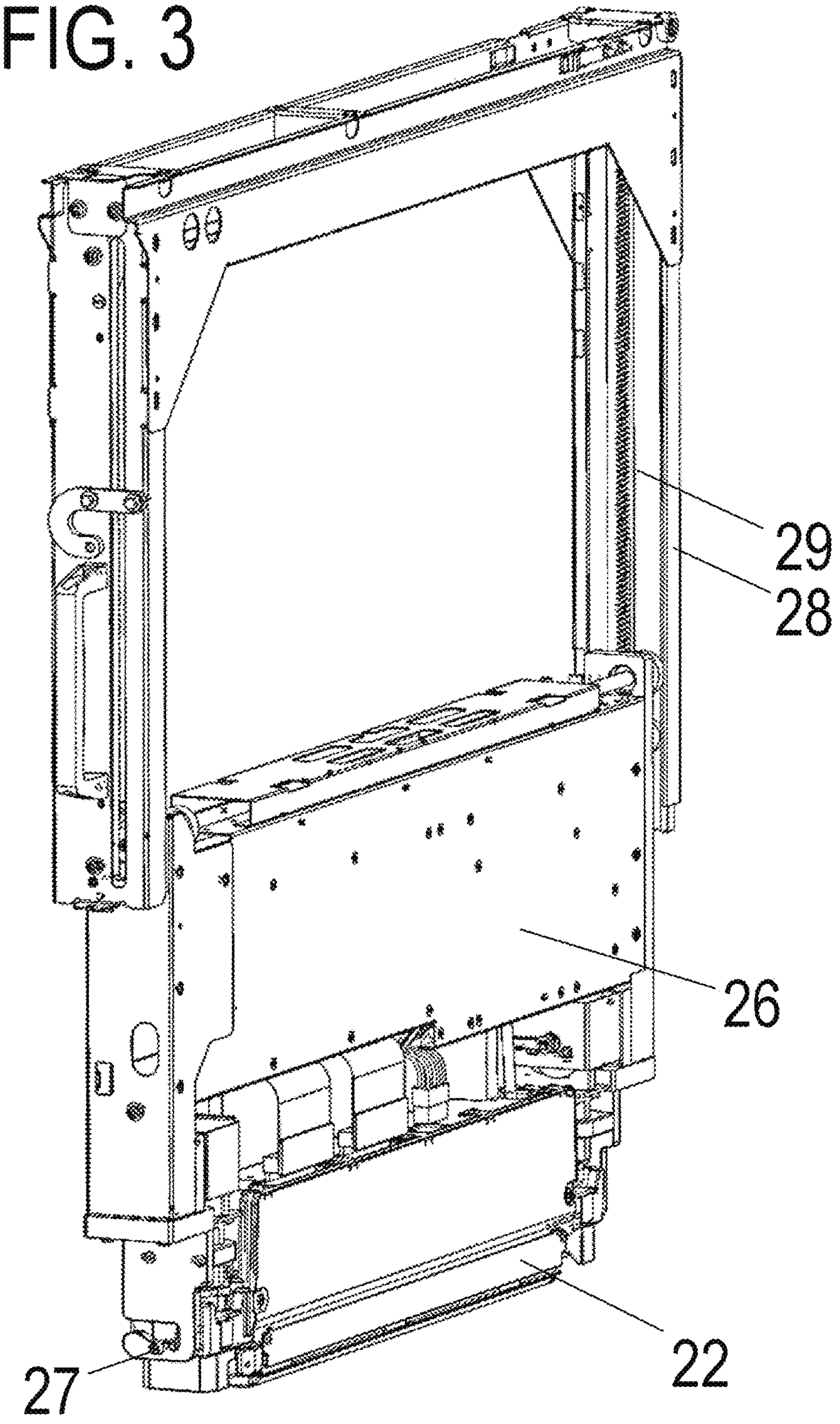
FIG. 3 is a perspective view of a recording head lifting mechanism according to the first embodiment.

The recording heads 22 are disposed opposing the recording surface of the sheet S and are configured to be movable closer to and away from the sheet S. FIG. 3 is a diagram showing a lifting mechanism of the recording heads 22. The recording heads 22 each have a support shaft 27 that protrudes in the width direction of the sheet S. In the recording heads 22, the support shaft 27 is supported by a holding portion 26 and is lifted up and down as one with the holding portion 26. The holding portion 26 performs the lifting operation up and down along lifting rails 29 provided within a recording head lifting frame 28 with a drive mechanism not shown provided internally.

The first scanner portion 9 is a unit for scanning an image formed on the sheet S by the recording portion 8 during printing and detecting image shift, image density, and the like to allow for printing to be corrected.

The drying portion 40 is a unit that reduces the liquid content contained in the liquid composition applied to the sheet S by the recording portion 8 and enhances the fixability of the ink to the sheet S. The drying portion 40 blows air onto the recorded sheet S and dries the applied ink. Inside the drying portion 40, the inking surface of the sheet S is dried by blowing air onto the passing sheet S at least from the inking surface side. Note that the drying method may be constituted by combining the method of blowing air with a method of irradiating the surface of the sheet S with electromagnetic waves (ultraviolet light, infrared light, etc.) or a conductive heat transfer method through contact with a heating element.

Winding guide rollers 31 are rollers over which the surface of the sheet S on the opposite side to the inking surface winds at a constant winding angle downstream of the recording portion 8 in the conveyance direction, since the influence on the recording portion 8 of air blown by the drying portion 40 needs to be blocked. In the first embodiment, two winding guide rollers 31 are disposed between the first scanner portion 9 and the drying portion 40, and the sheet S is folded back on itself substantially parallelly from the top to the bottom of the apparatus, with the drying portion 40 being disposed in a lower portion of the apparatus downward of the recording portion 8.

In the first embodiment, the conveyance path of the sheet S is designed such that air blown by the drying portion 40 does not affect the recording portion 8, due to provision of the winding guide rollers 31. On the other hand, in the case where a large amount of ink is applied to the recording medium, the conveyance path is preferably designed such that the sheet S is not folded back on itself, in order to prevent the ink from running on the folded portion of the sheet S. In this case, it is favorable for some sort of mechanism (partition wall, etc.) that is able block the influence of air blown by the drying portion 40 on the recording portion 8 to be installed separately between the recording portion 8 and the drying portion 40.

The cooling portion 50 cools the sheet S fixed in the drying portion 40 and hardens the softened ink, and also suppresses the amount of temperature change of the sheet S in processes downstream of the recording apparatus. Inside the cooling portion 50, the inking surface of the sheet S passing through is cooled by blowing air of a lower temperature than the sheet S onto the sheet S from at least the inking surface side. Note that the cooling method is not limited to a method of blowing air, and a conductive heat transfer method through contact with a heat dissipation member or a combination of these methods may be used.

The second scanner portion 10 is a unit for scanning a test image formed on the sheet S by the recording portion 8 before printing and detecting image shift, image density, and the like to allow for correction for final printing to be performed.

The second main conveyance portion 11 is a unit that conveys the sheet S while applying tension to the sheet S together with the first main conveyance portion 4, and adjusts the tension of the sheet S. The second main conveyance portion 11 rotates by being driven with a motor not shown, and the tension of the sheet S is adjusted by a clutch (not shown) that is able to control drive coupled torque, according to the tension value detected by the conveyance detection portion 6 from a tension control portion not shown. Note that, as an additional configuration for adjusting the tension of the sheet S, a configuration that controls the speed of the second main conveyance portion 11 with the conveyance detection portion 6 may be added. In this case, the recording apparatus 1 has two methods of tension control, namely, a torque control method for controlling the torque value that is transmitted from the clutch and a speed control method for controlling the roller speed of the second main conveyance portion 11. These tension control methods can be switched according to purpose or can both be used at the same time.

The second dancer portion 12 is a unit for applying a constant sheet tension between the second main conveyance portion 11 and the take-up roll portion 13. In the second dancer portion 12, sheet tension is applied by tensioning means not shown.

The take-up roll portion 13 is a unit for winding the sheet S that has undergone recording processing onto a winding core. The number of rolls capable of collecting the sheet S is not limited to one, and the take-up roll portion 13 may have two winding cores or three or more winding cores, and may be configured to collect the sheet S by switching selectively therebetween. Note that, depending on the processing content of the processes after recording, a configuration may be adopted in which the continuous sheet is cut using a cutter and the cut sheets S are loaded, rather than winding the sheet S onto a winding core.

Figure 4:
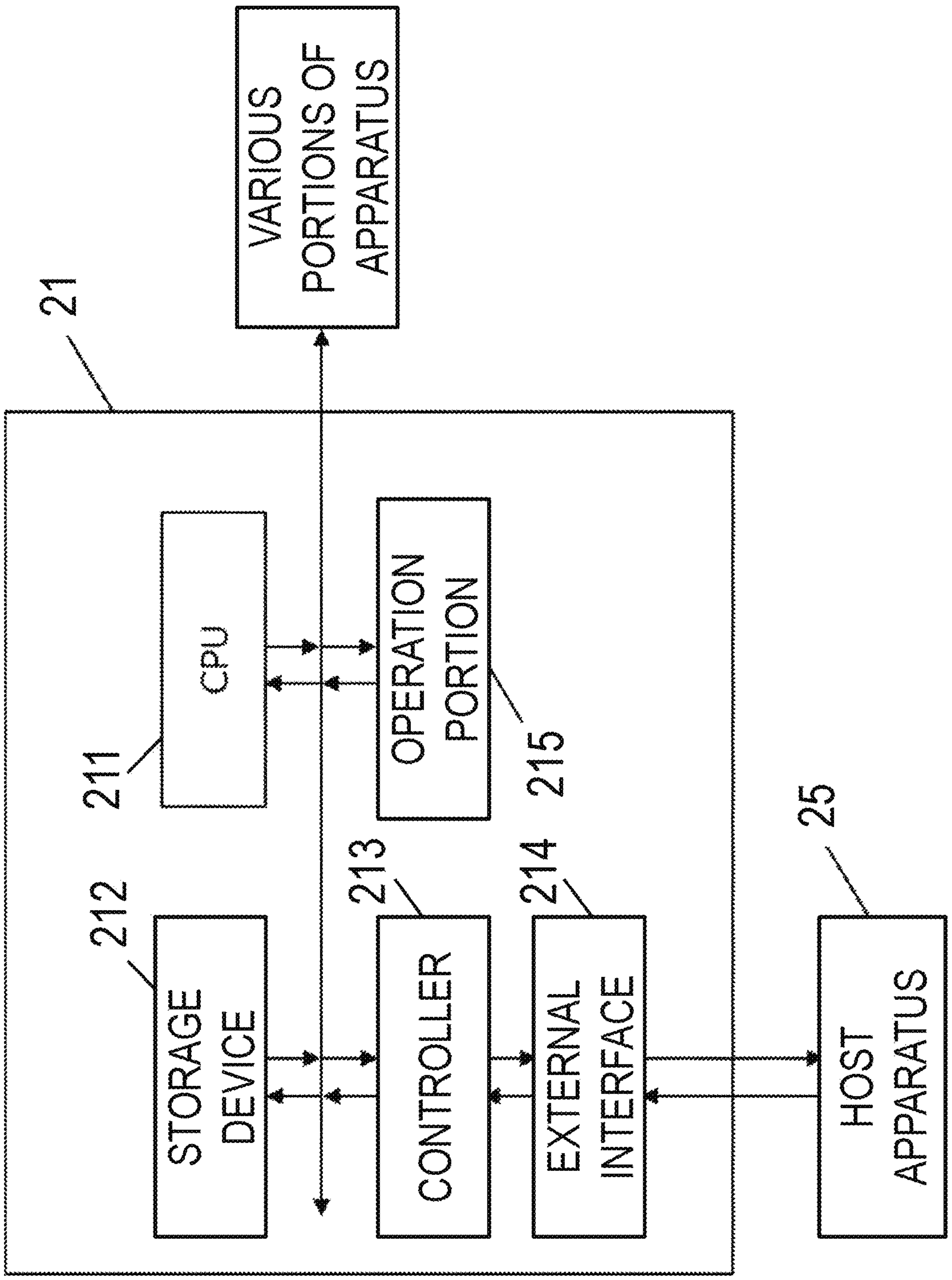
FIG. 4 is a block diagram of a control portion according to the first embodiment.

A control portion 21 is a unit that administers control of each portion of the entire recording apparatus. FIG. 4 shows a block diagram of the control portion 21. The control portion 21 includes a CPU 211, a storage device 212, a controller 213 including various types of control portions, an external interface 214, and an operation portion 215 on which the user performs input and output operations. Operations of the recording apparatus 1 are controlled based on commands from the controller or a host apparatus 25 such as a host computer that is connected to the controller via the external interface.

The maintenance portion 14 is a unit provided with a mechanism for restoring the discharge performance of the recording heads 22. Examples of such a mechanism include a cap mechanism that protects the ink discharge surface of the recording heads 22, a wiper mechanism that wipes the ink discharge surface, and a suction mechanism for sucking out ink inside the recording heads 22 from the ink discharge surface under negative pressure. Also, the maintenance portion is provided with a drive mechanism and a rail not shown, and is capable of moving horizontally back and forth along the rail, with the maintenance portion moving directly under the recording heads during maintenance of the recording heads, and moving from directly under the recording heads to a retracted position when not perform the maintenance operation.

Configuration of Drying Portion 40

Figure 5:
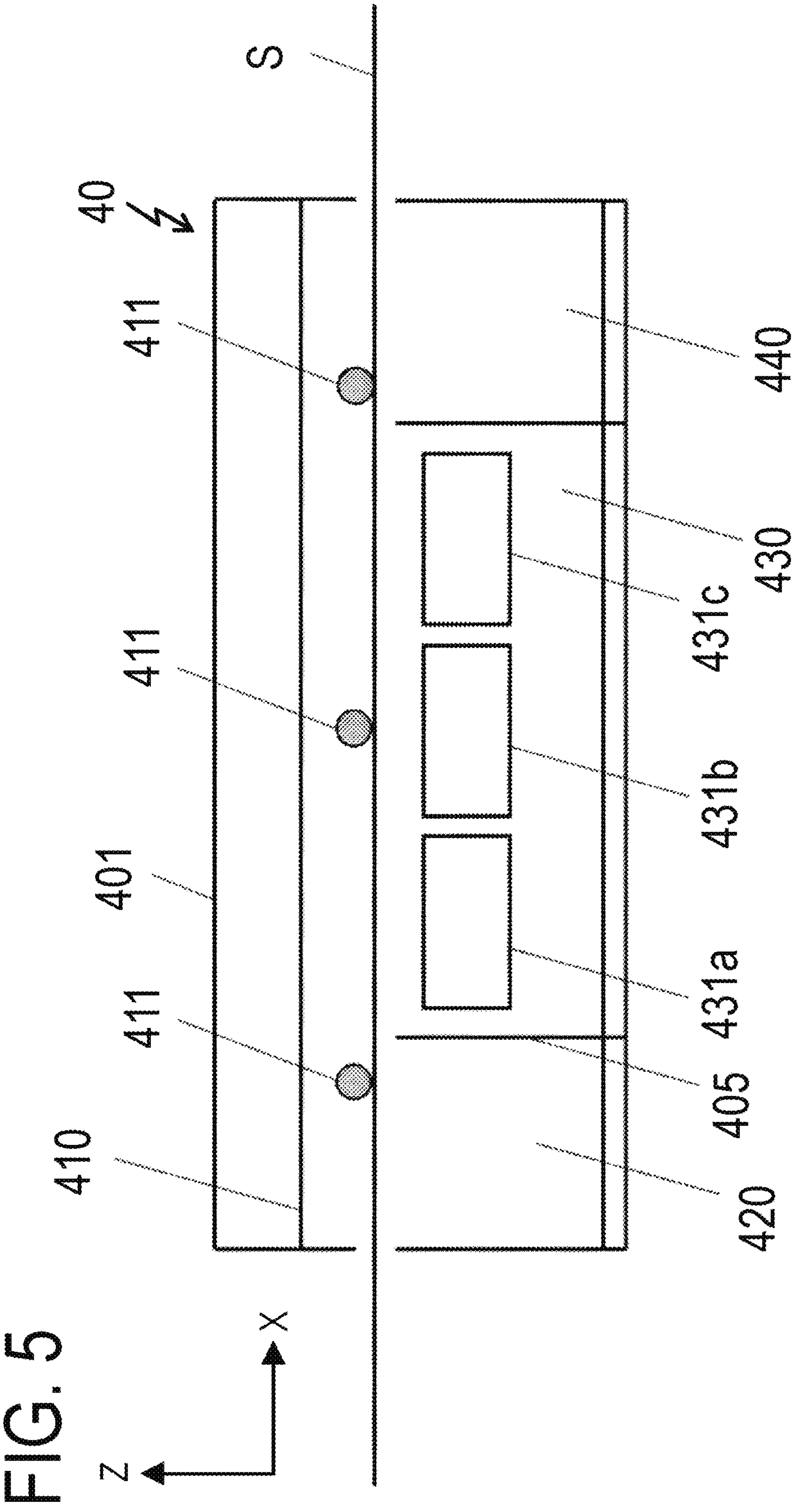
FIG. 5 is a cross-sectional view showing the configuration of a drying portion according to the first embodiment.

Next, the airflow application configuration of the drying portion 40 will be described in greater detail. FIG. 5 is a schematic cross-sectional view showing the internal structure of the drying portion 40 when the drying portion 40 is viewed in the width direction (Y direction) of the sheet S. The drying portion 40 has a casing 401. The casing 401 is provided with a sheet support portion 410 in which sheet support rollers 411 are disposed at positions in contact with the sheet S that is conveyed. In the drying portion 40, the sheet S is conveyed in the longitudinal direction (X direction) of the recording apparatus 1. The sheet support portion 410 restricts displacement of the sheet S in the Z direction with the sheet support rollers 411.

In the first embodiment, a first airflow space 420, a second airflow space 430, and a third airflow space 440 are provided opposing the sheet support portion 410 at an interval from the conveyed sheet S in the −Z direction (downward). The first airflow space 420, the second airflow space 430, and the third airflow space 440 are arranged in the X direction in order toward the downstream side from the upstream side in the conveyance direction of the sheet S. Note that “airflow space” refers to a space that is separated from other spaces by a partition wall. In the first embodiment, three airflow spaces are provided in the drying portion 40, but the number of airflow spaces is not limited.

Three airflow ducts 431*a*, 431*b*, and 431*c* are provided within the second airflow space 430. In the second airflow space 430, the airflow duct 431*a*, the airflow duct 431*b*, and the airflow duct 431*c* are arranged along the conveyed sheet S in the stated order from the upstream side in the conveyance direction of the sheet S. Each airflow duct 431 has an air blowing surface provided with a plurality of nozzle holes 601 (see FIG. 6), with the air blowing surface opposing the inking surface of the sheet S and being arranged so as to be substantially parallel to the sheet S.

In the first embodiment, the three airflow ducts 431*a*, 431*b*, and 431*c* are provided within the same airflow space, and each blow air toward the sheet S. The airflow ducts 431*a*, 431*b*, and 431*c* are air blowing portions configured to control air velocity and the like independently of each other.

Configuration of Second Airflow Space 430

Figure 6:
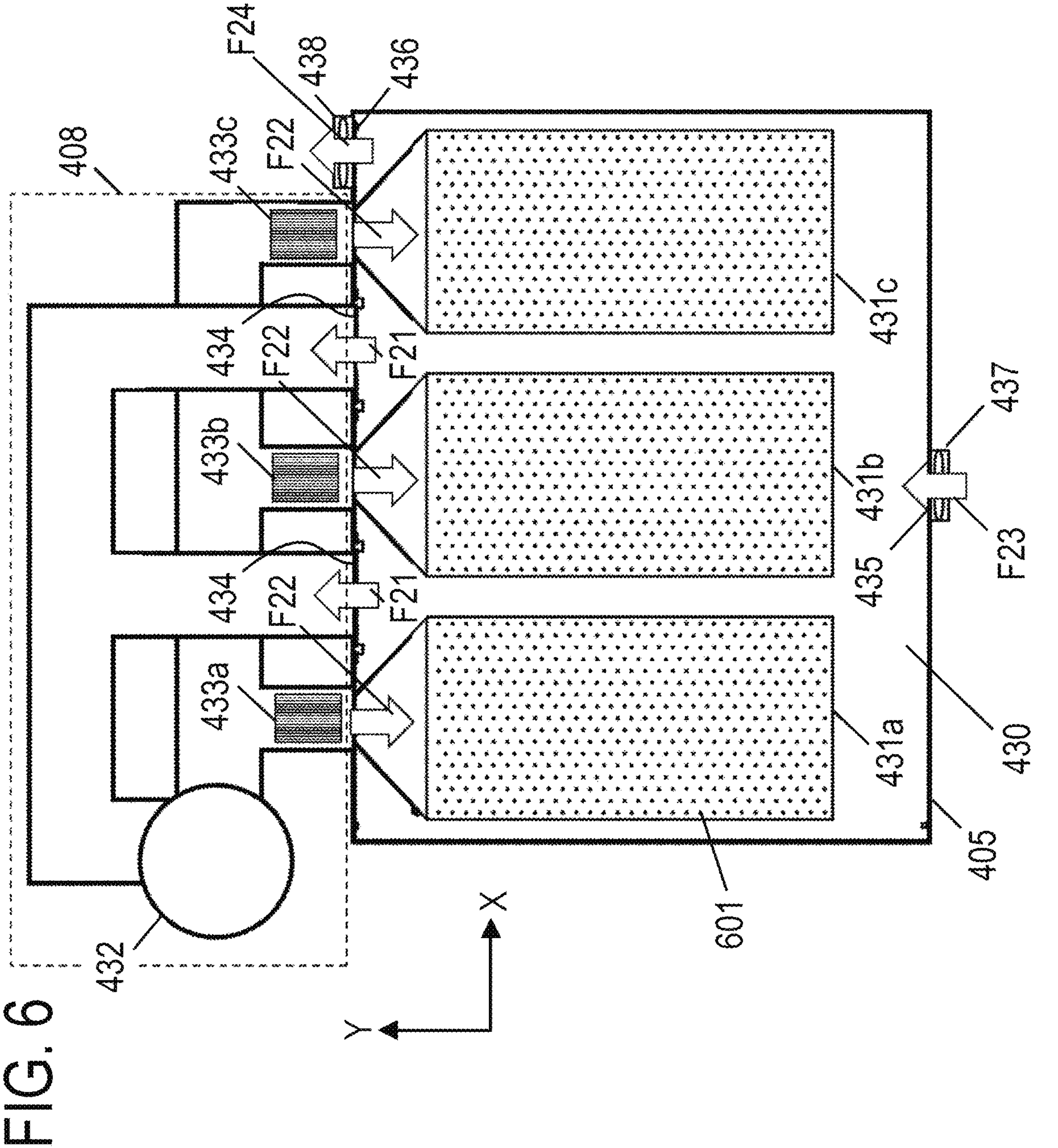
FIG. 6 is a schematic plan view showing a configuration of a second airflow space according to the first embodiment.

Next, the configuration of the second airflow space 430 will be described, with reference to FIG. 6. FIG. 6 is a diagram showing the internal configuration of the second airflow space 430 when the second airflow space 430 is viewed in the +Z direction (upward) from the −Z direction (downward) and the internal configuration of an air circulation and heating portion 408 that is connected to the second airflow space 430. The second airflow space 430 is constituted by a second casing 405 and the plurality of airflow ducts 431 (431*a* to 431*c*) housed on the inner side thereof. Also, in addition to connection paths for sending air to the airflow ducts 431 (not shown), the second casing 405 is provided with circulation exhaust ports 434, a ventilation port 435, an exhaust port 436, an intake fan 437, and an exhaust fan 438.

The air circulation and heating portion 408 equipped with an air blower 432 and heaters 433 is provided outside the second airflow space 430. The air blower 432 takes in air from inside the second airflow space 430 through the circulation exhaust ports 434 to the air circulation and heating portion 408 in an F21 direction. The air that is taken in is blown out from the air blower 432 in an F22 direction, and passes through the heaters 433 and is heated. The heated air is then sent to the airflow ducts 431. The temperature of the heated air is detected by an air temperature detection portion not shown. Heating by the heaters 433 is controlled according to a predetermined target temperature, based on the temperature that is detected. The heaters 433 are provided in correspondence with the airflow ducts 431. Specifically, a heater 433*a* that heats air to be sent to the airflow duct 431*a*, a heater 433*b* that heats air to be sent to the airflow duct 431*b*, and a heater 433*c* that heats air to be sent to the airflow duct 431*c* are provided in the air circulation and heating portion 408.

In the first embodiment, the temperature of the air that has passed through the heaters 433 is controlled to be in a range of 60 to 150° C. The heated air flows in the F22 direction and is blown from the airflow ducts 431 onto the sheet S. In the airflow ducts 431, a plurality of small diameter (e.g., 1.5 to 5 mm) round holes are formed in a regular manner. As a result of such a configuration, air is uniformly blown through the round holes onto the sheet S in the drying portion 40. Note that the airflow ducts 431 are not limited to a round hole shape, and may be constituted by straight slit holes, holes having elliptical shape or other shapes, or a combination thereof.

When the liquid of the ink on the sheet S evaporates inside the second airflow space 430, the vapor pressure in the second airflow space 430 rises. When the vapor pressure within the second airflow space 430 rises excessively, a desired amount of evaporation cannot be obtained and poor drying occurs. Thus, air is taken in from outside the recording apparatus 1 and circulated by the intake fan 437 and the exhaust fan 438 provided in the second casing 405.

The intake fan 437 takes in external air in an F23 direction through an opening (not shown) provided in the recording apparatus 1, and sucks the air into the second airflow space 430 through the ventilation port 435. The exhaust fan 438 exhausts air from the second airflow space 430 through the exhaust port 436 in an F24 direction. The exhausted air is expelled outside the drying portion 40. In this way, it becomes possible to stably maintain the air pressure and ventilation amount within the space, by separately providing a fan for intake and a fan for exhaust within the space.

Note that, in the first embodiment, ventilation is performed by the intake fan 437 and the exhaust fan 438, but in application of the present invention, ventilation is not limited to such a configuration. For example, ventilation may be implemented by either one of the fans. Also, ventilation means may be provided in the air circulation and heating portion 408.

Also, in the second airflow space 430, any drying mode that blows airflow onto the sheet S can be applied. For example, the airflow ducts 431 and the air circulation and heating portion 408 are not limited to the above-described configuration, and may be realized by any number of installations, any air blowing means, and any heating means. Additionally, a drying method employing a radiation heater can be used concurrently or in combination. Also, in the first embodiment, hot air is circulated by the heaters 433, but a configuration may be adopted in which the heaters 433 are not installed and air is circulated at room temperature.

Airflow Action of Second Airflow Space

Figure 7:
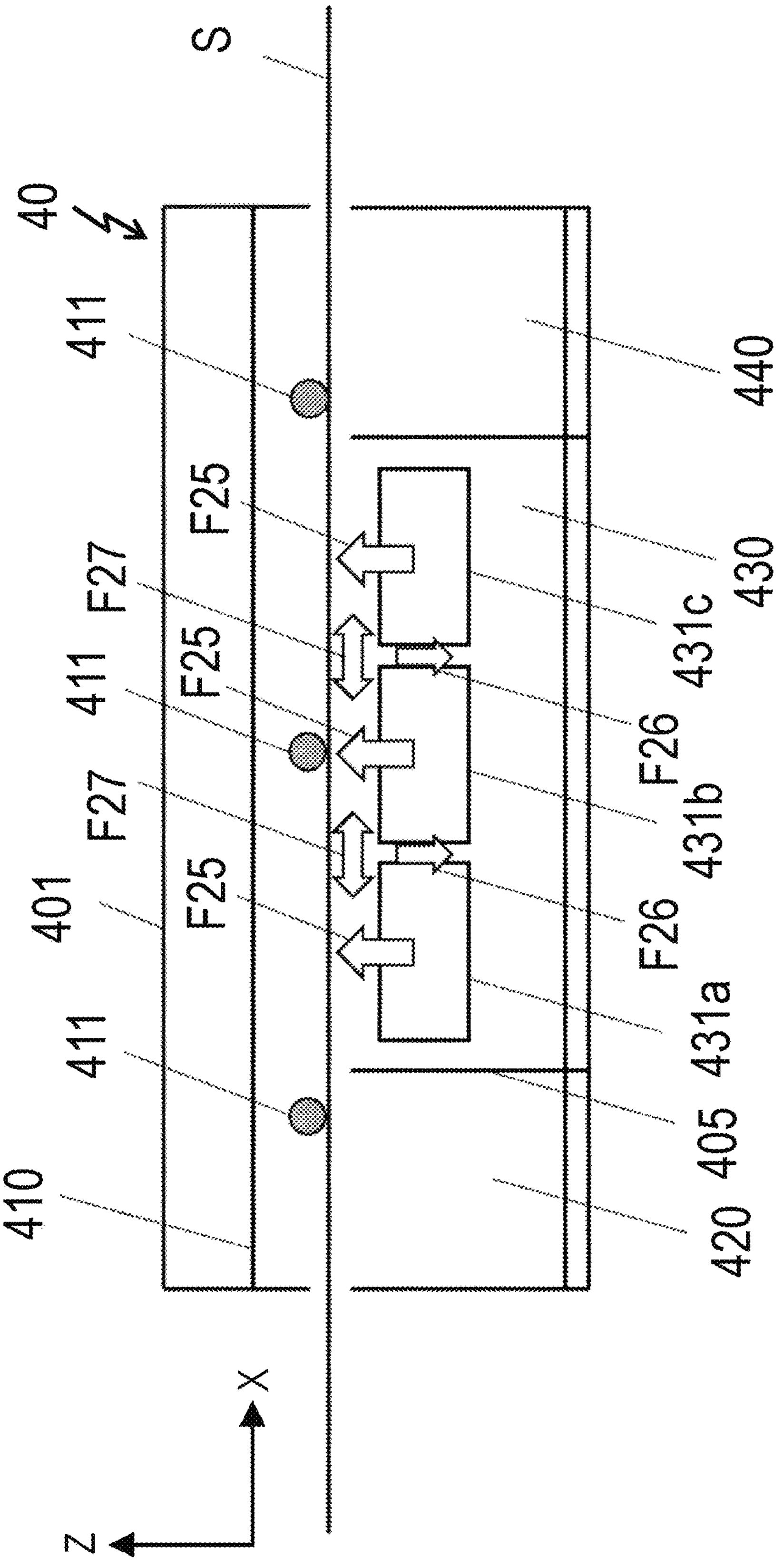
FIG. 7 is a schematic cross-sectional view showing an internal airflow of the drying portion according to the first embodiment.

Next, the airflow action inside the second airflow space will be described, with reference to FIG. 7. FIG. 7 is a schematic cross-sectional view showing the internal airflow of the drying portion 40 when the drying portion 40 is viewed in the width direction (Y direction) of the sheet S.

As described above, the second airflow space 430 is equipped with three airflow ducts 431*a* to 431*c*. The airflow ducts 431 blow air in an F25 direction (+Z direction) onto the sheet S and accelerate drying of the ink on the sheet S. In the drying portion 40, the sheet S is conveyed with the inking surface to which ink has been applied as a liquid composition by the recording portion 8 facing downward, and warm air is blown toward the inking surface of the sheet S from the air blowing surfaces of the airflow ducts 431.

A certain amount of the air blown onto the sheet S from the airflow ducts 431 flows in an F26 direction (−Z direction) between the airflow duct 431*a* and the airflow duct 431*b* and between the airflow duct 431*b* and the airflow duct 431*c*. The air flowing between the airflow ducts 431 adjacent to each other in the conveyance direction (X direction) of the sheet S is taken into the air circulation and heating portion 408 and reused.

Air velocities V of the airflow ducts 431 that are provided within the second airflow space 430 can be independently controlled for the respective airflow ducts 431. Also, nozzle hole diameters R and total nozzle hole cross-sectional areas D of the airflow ducts 431 can be individually set for the respective airflow ducts 431. Total air amounts F of the airflow ducts 431 are determined by the air velocities V and the total nozzle hole cross-sectional areas D of the airflow ducts 431. Note that "air velocities V of the airflow ducts 431" refers to the air velocity in the nozzle holes of each airflow duct 431. Also, "total nozzle hole cross-sectional areas D of the airflow ducts 431" refers to the total value of the cross-sectional areas of the plurality of nozzle holes in each airflow duct 431. Also, "total air amounts F of the airflow ducts 431" refers to the amount of gas flowing per unit time (total flow rate of gas) blown from all the nozzle holes of each airflow duct 431. These terms are used with similar meanings in the following descriptions.

In the first embodiment, the total nozzle hole cross-sectional areas D of the airflow ducts 431 are set and the air velocities V are controlled, such that the ratio of the total air amounts F of the respective airflow ducts 431 is within a predetermined range. Specifically, when the air velocity V of one of the airflow ducts 431 is greater than the air velocity V of another airflow duct 431, the total nozzle hole cross-sectional area D of the one airflow duct 431 is set smaller than the total nozzle hole cross-sectional area D of the other airflow duct 431.

The nozzle hole configuration and airflow control of the airflow ducts 431 in the first embodiment will now be described more specifically. Within the second airflow space 430, the airflow ducts 431 adjacent to each other in the conveyance direction of the sheet S are given as a first airflow duct (first air blowing portion) and a second airflow duct (second air blowing portion). Also, the air velocity of the first airflow duct is given as a first air velocity VL, the total nozzle hole cross-sectional area of first nozzle holes of the first airflow duct is given as a first total cross-sectional area DL, and the total air amount of the first airflow duct is given as a first total air amount FL. Similarly, the air velocity of the second airflow duct is given as a second air velocity VH, the total nozzle hole cross-sectional area of second nozzle holes of the second airflow duct is given as a second total cross-sectional area DH, and the total air amount of the second airflow duct is given as a second total air amount FH. At this time, in the first embodiment, nozzle design and air blowing control are performed so as to satisfy the following expressions (1) to (3) with regard to the airflow ducts 431*a* and 431*b* or the airflow ducts 431*b* and 431*c*.

$$1.2VL \le VH \le 3.0VL \tag{1}$$

$$1.2DH \le DL \le 4.5DH \tag{2}$$

$$FH{:}FL = 2{:}3 \text{ to } 3{:}2 \tag{3}$$

Effects that are obtained by the recording apparatus 1 configured to satisfy the above-described expression (1) will now be described. For example, in the case of a configuration in which VH<1.2VL and expression (1) is not satisfied, a sufficient difference in air velocity is not obtained in the two airflow ducts 431. With such a configuration, the drying operation is performed at air velocities of an equivalent level on the upstream side and the downstream side in the conveyance direction, and thus it is difficult to efficiently proceed with drying while suppressing air blow streaking of the liquid composition.

Also, for example, in the case of a configuration in which 3.0VL<VH and expression (1) is not satisfied, the air velocity difference between the two airflow ducts 431 is excessive. With such a configuration, the first air velocity VL is excessively low in the first airflow duct on the low air velocity V side, possibly causing deterioration of drying efficiency. Also, with such a configuration, the second air velocity VH is excessively high in the second airflow duct on the high air velocity V side, possibly causing air blow streaking of the liquid composition.

On the other hand, in the first embodiment, out of airflow ducts 431 adjacent to each other, the air velocity V of the airflow duct 431 located on the upstream side in the conveyance direction of the sheet S is set to be less than equivalent to the air velocity V of the airflow duct 431 located on the downstream side so as to satisfy expression (1). For example, the air velocity V and nozzle configuration of the airflow duct 431*c* may be set to be similar to the airflow duct 431*b*, while increasing the air velocity V of the airflow duct 431*b* relative to the air velocity V of the airflow duct 431*a* located most upstream in the conveyance direction within the second airflow space 430. Also, for example, the air velocity V and nozzle configuration of the airflow duct 431*a* may be set to be similar to the airflow duct 431*b*, while increasing the air velocity V of the airflow duct 431*c* relative to the air velocity V of the airflow duct 431*b* located in the middle of the conveyance direction within the second airflow space 430.

Due to the airflow ducts 431*a* to 431*c* being configured as described above, low velocity air is blown onto the sheet S on the upstream side in the conveyance direction, and high velocity air is blown onto the sheet S on the downstream side in the conveyance direction. In this way, in the first embodiment, low velocity air is blown in a state where drying of the liquid composition on the sheet S is at a relatively early stage, and thus air blow streaking of the liquid composition is suppressed. High velocity air is then blown in a state where drying of the liquid composition is at a later stage, and thus efficiency of the drying operation is improved.

Next, effects that are obtained by the recording apparatus 1 configured to satisfy the above-described expression (2) will be described. For example, in the case of a configuration in which $DL<1.2DH$ and expression (2) is not satisfied, it is difficult to provide a sufficient difference in air velocity between the first total cross-sectional area DL and the second total cross-sectional area DH. Accordingly, with such a configuration, the drying operation is performed at air velocities of an equivalent level on the upstream side and the downstream side in the conveyance direction, and thus it is difficult to efficiently proceed with drying while suppressing air blow streaking of the liquid composition.

Also, for example, in the case of a configuration in which $4.5DH<DL$ and expression (2) is not satisfied, the first total cross-sectional area DL of the first airflow duct on the low air velocity side can be excessively large. Accordingly, with such a configuration, the air blown from the first airflow duct is not readily expelled from the space between the sheet S and the first airflow duct, possibly resulting in deterioration of drying efficiency.

On the other hand, in the first embodiment, the total nozzle hole cross-sectional areas D of the respective airflow ducts 431 adjacent to each other are set to satisfy expression (2). According to such a configuration, the air velocity of each airflow duct 431 can be appropriately set to suppress air blow streaking of the liquid composition and improve the efficiency of the drying operation, and the total nozzle hole cross-sectional area D can be prevented from becoming excessively large, enabling deterioration of drying efficiency to be suppressed.

Next, effects that are obtained by the recording apparatus 1 configured to satisfy the above-described expression (3) will be described. In the first embodiment, the nozzle configurations of the airflow ducts 431*a* to 431*c* are set and the air velocities V are controlled to satisfy expression (3) described above. Specifically, in the first embodiment, the ratio of the total air amounts F of two airflow ducts 431 adjacent to each other is controlled so as to be within a predetermined range, so as to prevent the difference in the total air amounts F of the two airflow ducts 431 from increasing. As a result of such a configuration, the airflow emitted from one of the airflow ducts 431 is suppressed from affecting the airflow emitted from the other airflow duct 431, and the occurrence of drying unevenness due to the airflow being disturbed (crossflow) can be suppressed.

The effect of suppressing drying unevenness by the above configuration will now be described in greater detail. For example, in the case of a configuration in which $FL:FH\neq 2:3$ to $3:2$ and expression (3) is not satisfied, the total air amount F of one of the airflow ducts 431 is significantly different from that of other airflow duct 431. When there is a large difference in the total air amounts F of two airflow ducts 431 arranged adjacent to each other in the conveyance direction, the air blown from the airflow duct 431 having the larger total air amount F can flow between the airflow duct 431 having the smaller total air amount F and the sheet S. In particular, the amount of air flowing in an F27 direction in FIG. 7 from one airflow duct 431 to between the other airflow duct 431 and the sheet S increases as the difference in the total air amounts F of the respective airflow ducts 431 increases. In this way, when a large amount of air flows from one airflow duct 431 to between the other airflow duct 431 and the sheet S, crossflow occurs between the other airflow duct 431 and the sheet S, causing drying unevenness due to the liquid composition on the sheet S not drying uniformly.

On the other hand, according to the configuration of the first embodiment, the ratio of the total air amounts F of the respective airflow ducts 431 arranged adjacent to each other in the conveyance direction is controlled so as to be within a predetermined range. According to such a configuration, air emitted from an airflow duct 431 into the space between another airflow duct 431 and the sheet S can be suppressed from flowing strongly in the direction of F27, and thus disturbance of the airflow toward the sheet S from the airflow ducts 431 can be suppressed. Consequently, drying unevenness can be suppressed while suppressing air blow streaking of the liquid composition and deterioration of drying efficiency.

In the case where a difference is provided in the air velocities of two airflow ducts 431 as described above, the total air amount of each airflow duct 431 can be easily adjusted to an equivalent level, by providing a difference in the nozzle hole diameters of the airflow ducts 431. For example, by increasing the nozzle hole diameter R of the airflow duct 431 having the lower air velocity to be larger than the nozzle hole diameter R of the airflow duct 431 having the higher air velocity, the total air amounts F of the airflow ducts 431 easily approach an equivalent level.

It is favorable for the nozzle design to satisfy the following expression (4), where RL is a first nozzle hole diameter of the first airflow duct having the lower air velocity, and RH is a second nozzle hole diameter of the second airflow duct having the higher air velocity.

$$RH < RL \leq 2.4RH \tag{4}$$

Also, in order to adjust the total air amounts F of the airflow ducts 431 to an equivalent level while providing a difference in the air velocities V of the two airflow ducts 431, the number of nozzle holes provided in each airflow duct 431 may be set to a different value in each airflow duct 431. The density of nozzle holes in the air blowing surface increases as the number N of nozzle holes of the airflow ducts 431 increases, and thus air that is emitted from the airflow ducts 431 is not readily expelled from the space between the sheet S and the airflow ducts 431. Since this leads to deterioration of fuel efficiency, it is not preferable to provide a large difference in the number N of nozzle holes between the airflow ducts 431 and excessively increase the number N of nozzle holes of one of the airflow ducts 431. In view of this, the nozzles are favorably designed so as to satisfy the following expression (5), where NL is a first number of nozzle holes of the first airflow duct having a lower air velocity and NH is a second number of nozzle holes of the second airflow duct having a higher air velocity.

$$0.8NH \leq NL \leq 1.2NH \quad (5)$$

From the above, in order to suppress generation of crossflow, in the first embodiment, the air velocity V, the total nozzle hole cross-sectional area D, the nozzle hole diameter R, and the number N of nozzle holes of the airflow ducts 431 are set such that the ratio of the total air amounts F of the airflow ducts 431 is within a predetermined range. At this time, occurrence of crosstalk is most effective suppressed, particularly when the values are set such that the relational expression (3) described above is FH:FL=1:1, and the total air amounts F of the airflow ducts 431 are an equivalent level.

Also, in an airflow space in which a plurality of airflow ducts 431 are disposed such as the second airflow space 430, it is preferable that the air blowing surface of the airflow ducts 431 and the sheet S are constituted to be as horizontal as possible. This is because control of crossflow is facilitated by such a configuration.

Nozzle Hole Disposition Configuration

Figure 8:
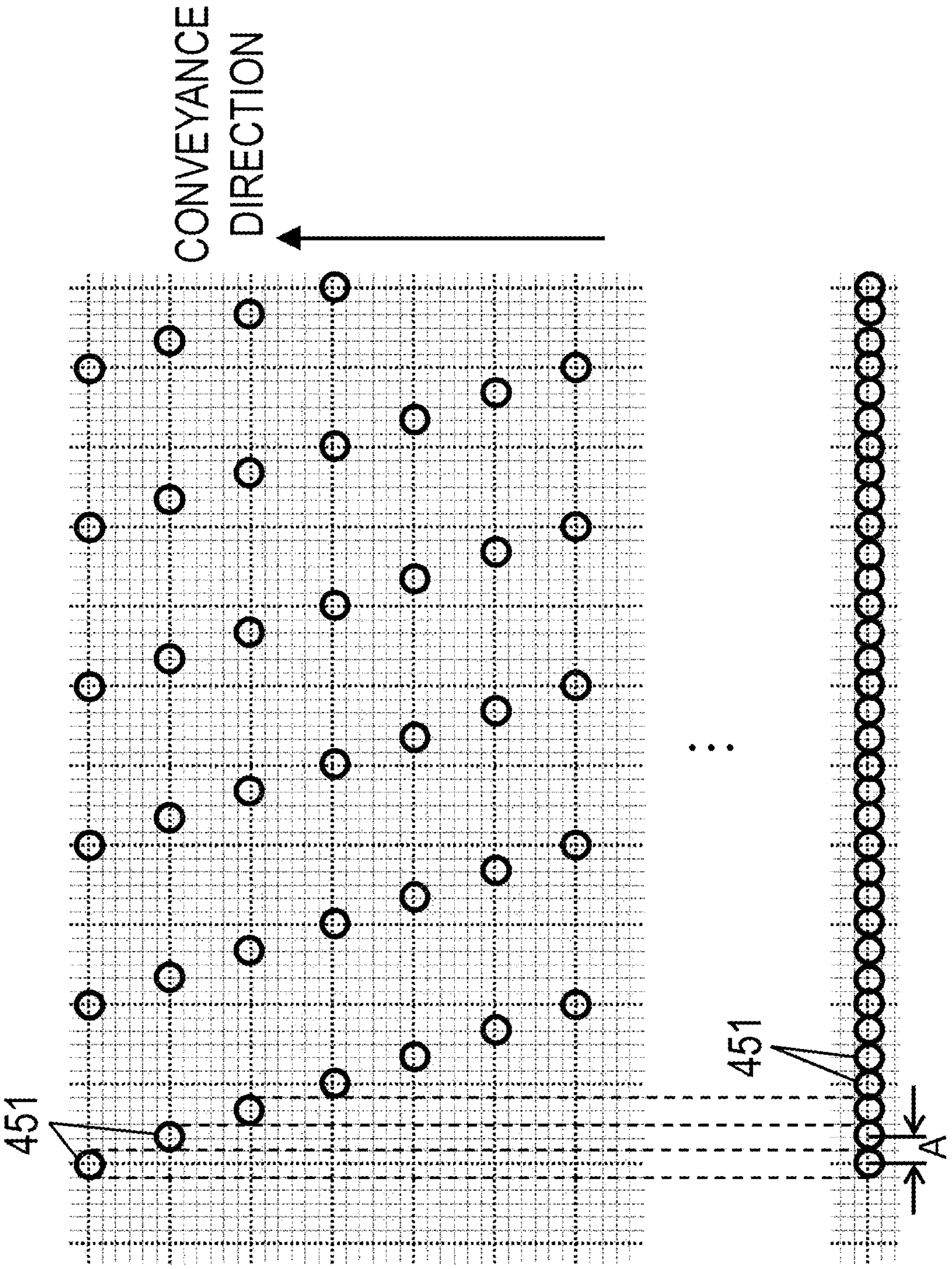
FIG. 8 is a diagram showing an example disposition configuration of nozzle holes according to the first embodiment.
Figure 9:
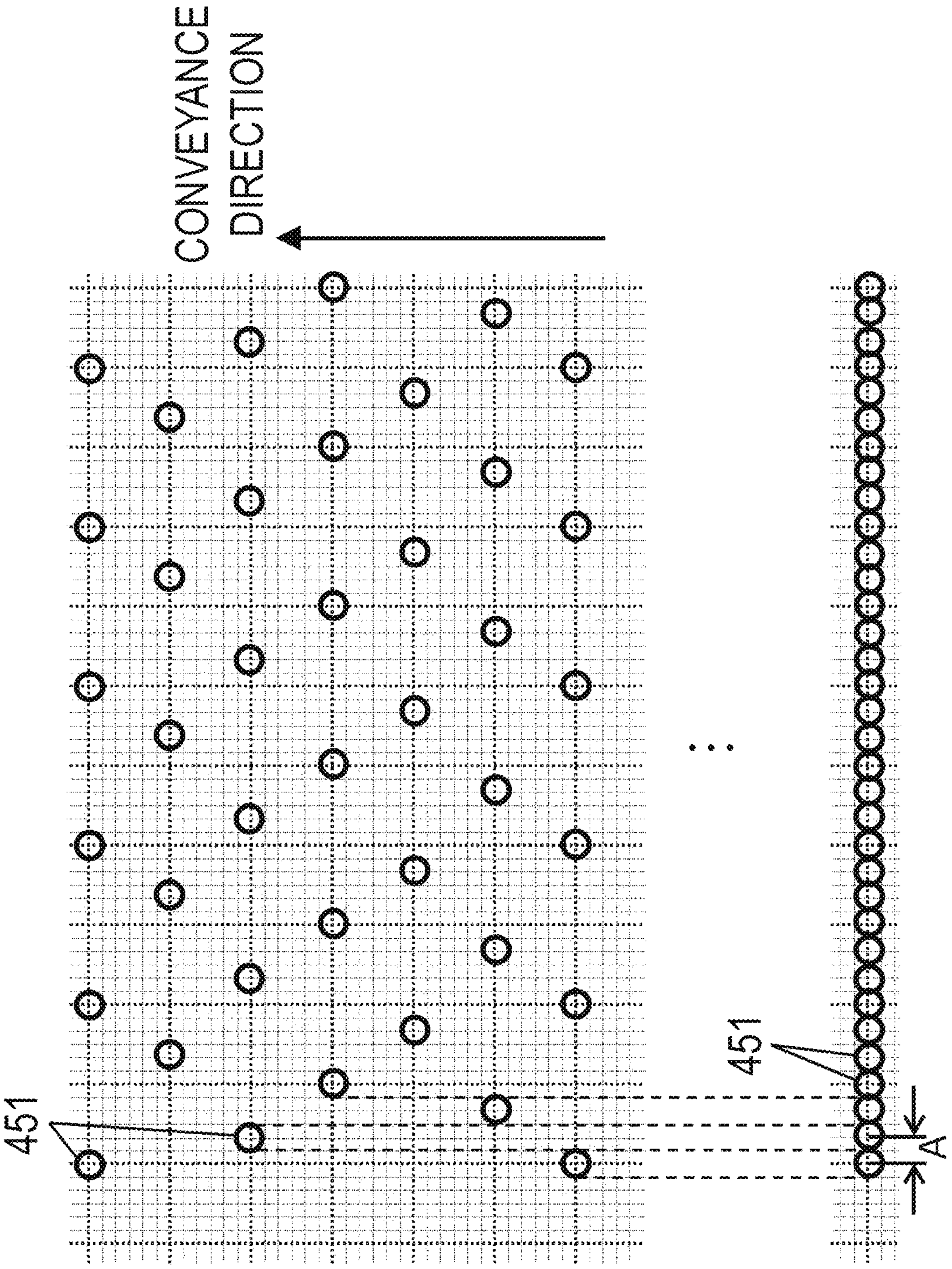
FIG. 9 is a diagram showing an example disposition configuration of nozzle holes according to the first embodiment.
Figure 10:
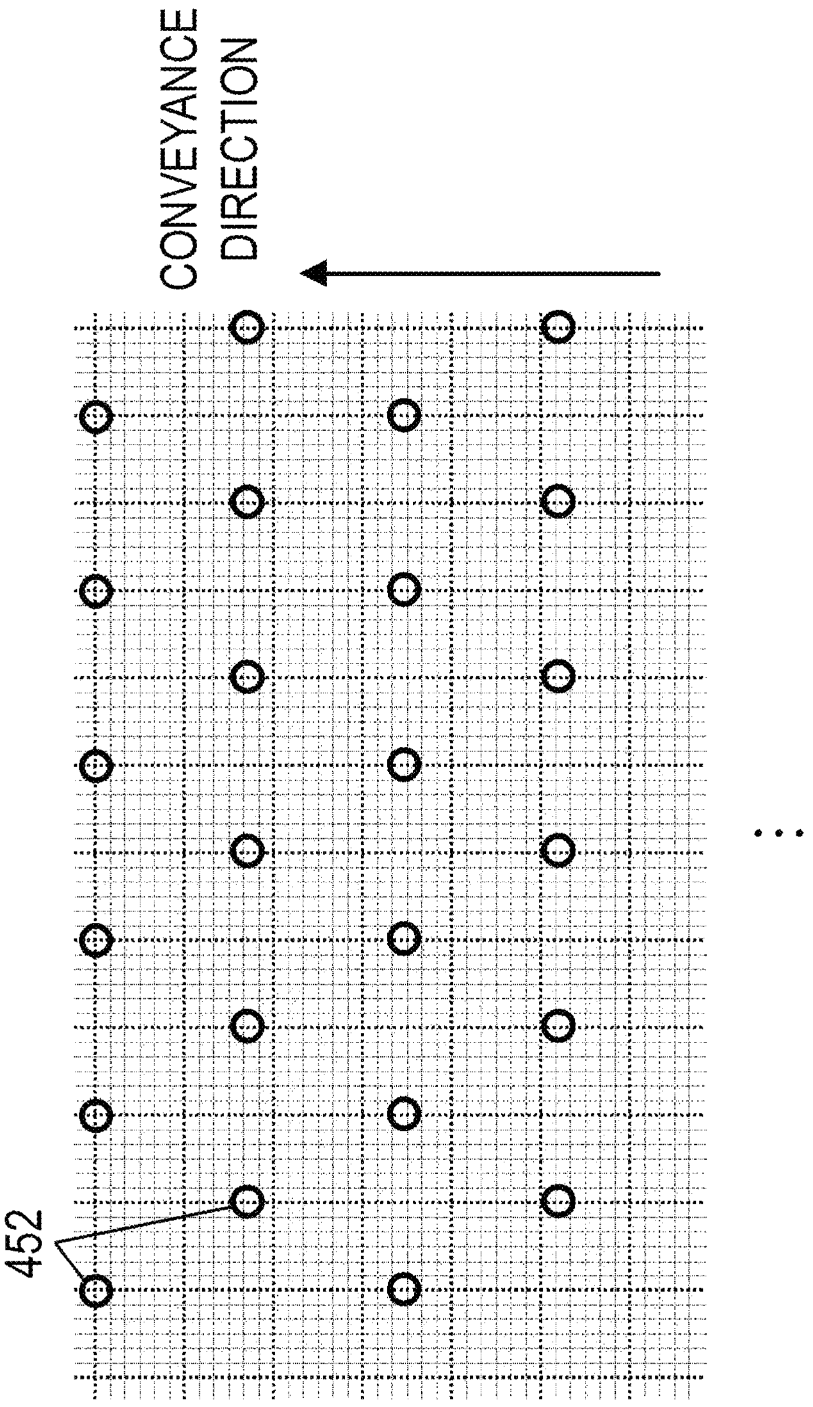
FIG. 10 is a diagram showing an example disposition configuration of nozzle holes according to the first embodiment.

Next, example disposition configurations of the nozzle holes of the airflow ducts 431 will be described, with reference to FIGS. 8, 9, and 10. FIG. 8 is a diagram showing a first example disposition configuration of the first nozzle holes of the first airflow duct disposed on the upstream side in the conveyance direction in which the air velocity is set low. FIG. 9 is a diagram showing a second example disposition configuration of the first nozzle holes of the first airflow duct disposed on the upstream side in the conveyance direction in which the air velocity is set low. FIG. 10 is a diagram showing an example disposition configuration of the second nozzle holes of the second airflow duct disposed on the downstream side in the conveyance direction in which the air velocity is set high. In FIGS. 8 to 10, ruled lines for indicating the disposition spacing of the nozzle holes are depicted.

The upper portion of FIG. 8 shows a first example disposition configuration of a plurality of first nozzle holes 451 when the first nozzle holes 451 are viewed from a direction perpendicular to the air blowing surface of the first airflow duct. The lower portion of FIG. 8 shows the positional relationship of the first nozzle holes 451 of the first example disposition configuration when the first nozzle holes 451 are projected in the conveyance direction of the sheet S. As shown in FIG. 8, the plurality of first nozzle holes 451 are disposed to be gradually shifted in the width direction of the sheet S proceeding toward the downstream side in the conveyance direction of the sheet S. That is, when the first nozzle holes 451 are projected in the conveyance direction, the first nozzle holes 451 that are adjacent to each other in the conveyance direction are also adjacent to each other in the width direction. In the first airflow duct, a plurality of such nozzle hole rows are formed in the air blowing surface, and the first nozzle holes 451 are disposed to cover the entire region of the sheet S in the width direction of the sheet S.

In the first embodiment, X=RL×A, where X the pitch of the first nozzle holes 451 in the width direction of the sheet S (RL is the first nozzle hole diameter). FIG. 8 shows an example nozzle disposition configuration in a state where A=1.0. In order to suppress printing unevenness, it is favorable for the nozzles to be designed to satisfy the following expression (6).

$$0.8 \leq A \leq 1.3 \quad (6)$$

FIG. 8 shows a configuration in which the nozzle hole positions are gradually shifted along the conveyance direction as the first example disposition configuration of the first nozzle holes 451, but in application of the present invention, the way in which the nozzle hole positions are shifted is not limited thereto. For example, as with the second example disposition configuration shown in FIG. 9, the plurality of first nozzle holes 451 may be shifted in random order so as to satisfy the above-described expression (6).

The upper portion of FIG. 9 shows a second example disposition configuration of the plurality of first nozzle holes 451 when the first nozzle holes 451 are viewed from a direction perpendicular to the air blowing surface of the first airflow duct. The lower portion of FIG. 9 shows the positional relationship of the first nozzle holes 451 when the first nozzle holes 451 of the second example disposition configuration are projected in the conveyance direction of the sheet S. In such a disposition configuration, the first nozzle holes 451 adjacent to each other in the conveyance direction are not necessarily adjacent to each other in the width direction, when the first nozzle holes 451 are projected in the conveyance direction. Printing unevenness can also be suppressed with such a configuration, due to the first nozzle holes 451 being disposed to cover the entire region of the sheet S in the width direction of the sheet S, so as to satisfy the above-described expression (6).

For example, in the case of a configuration in which 1.3<A and expression (6) is not satisfied, the pitch X is large, and the spacing between the first nozzle holes 451 in the width direction of the sheet S is large. When the first nozzle holes 451 are disposed at an excessive pitch X, regions where airflow is weak occur in spaces such as between adjacent first nozzle holes 451, and printing unevenness can occur due to temperature difference and the histories of air exposure on the sheet S. In particular, in the first airflow duct disposed on the upstream side in the conveyance direction in which the air velocity is controlled to be low, printing unevenness due to an excessive pitch X can be marked.

Also, for example, in the case of a configuration in which A<0.8 and expression (6) is not satisfied, the pitch X is small and the spacing between the first nozzle holes 451 in the width direction of the sheet S is small. When the first nozzle holes 451 are disposed at an insufficient pitch X, printing unevenness may occur due to the histories of air exposure on the sheet S overlapping.

On the other hand, in the first embodiment, the nozzle holes are disposed so as to satisfy expression (6), with regard to the airflow duct 431 that is disposed on the upstream side in the conveyance direction with respect to another airflow duct 431, such as the airflow duct 431*a* or the airflow duct 431*b*. As a result of such a configuration, overlap of the air in the width direction of the sheet S can be optimized, and printing unevenness caused by the disposition configuration of the nozzle holes can be suppressed. In other words, printing unevenness due to the influence of air and temperature can be suppressed, by disposing the nozzle holes as described above.

FIG. 10 shows an example disposition configuration of a plurality of second nozzle holes 452 when the second nozzle holes 452 are viewed from a direction perpendicular to the air blowing surface of the second airflow duct. The second nozzle holes 452 of the second airflow duct disposed on the downstream side in the conveyance direction are preferably provided at equal intervals in the conveyance direction and the width direction as shown in FIG. 10, in order to improve drying efficiency. Also, in the first embodiment, the pitch X, in the width direction, of the second nozzle holes 452 of the airflow duct 431 disposed on the downstream side in the conveyance direction is set larger than the pitch X, in the width direction, of the first nozzle holes 451 of the airflow duct 431 disposed on the upstream side in the conveyance direction.

For example, in the case where the disposition spacing (pitch) of the second nozzle holes 452 of the second airflow duct is not constant, the drying speed of the printed film tends to be uneven, and it takes time for the entire printed film on the sheet S to dry, possibly resulting in deterioration of drying efficiency. In particular, in the airflow duct 431 that is disposed on the downstream side in the conveyance direction in which the air velocity is controlled to be high, the drying rate of the printed film becomes markedly uneven, possibly resulting in significant deterioration of drying efficiency.

On the other hand, in the first embodiment, in the airflow duct 431 disposed on the downstream side in the conveyance direction with respect to another airflow duct 431, such as the airflow duct 431*b* or the airflow duct 431*c*, the second nozzle holes 452 are spaced constantly as described above. As a result of such a configuration, deterioration of drying efficiency can be suppressed.

From the above, according to the instant invention, due to the second airflow space 430 being constituted so as to satisfy expressions (1) to (3), drying unevenness due to crossflow can be suppressed while suppressing air blow streaking of the liquid composition and deterioration of drying efficiency. In order to obtain these effects, it is also favorable to additionally configure the airflow ducts 431 so as to satisfy expressions (4) and (5). Furthermore, printing unevenness can be suppressed by constituting the airflow duct 431*a* or the airflow duct 431*b* with the nozzle holes disposed so as to satisfy expression (6).

The effects of the instant invention are even more favorably exhibited when the distance between the outermost covering of two airflow ducts 431 adjacent to each other in the conveyance direction of the sheet S is 50 mm or less, and particularly when 30 mm or less. This is because the degree to which air emitted from one of the airflow ducts 431 affects the airflow between the other airflow duct 431 and the sheet S tends to increase as the distance between the two airflow ducts decreases. That is, the instant invention is particularly favorable for a configuration in which air emitted from one airflow duct 431 tends to flow strongly in the space between another airflow duct 431 and the sheet S.

Also, the effects of the instant invention are even more favorably exhibited when the distance between the air blowing surface of each airflow duct 431 and the sheet S is 30 mm or less, and particularly when 15 mm or less. This is because the degree to which air emitted from one of the airflow ducts 431 affects the airflow between the other airflow ducts 431 and the sheet S tends to increase as the distance between the air blowing surface of the airflow duct 431 and the sheet S decreases.

Example Configuration

Next, a specific example configuration according to the first embodiment of the instant invention will be illustratively described. Hereinafter, as example configurations, a plurality of combinations of nozzle hole patterns and air velocities V for obtaining the effect of suppressing air blow streaking of the liquid composition and the effect of suppressing drying unevenness will be shown. Hereinafter, the pattern image of the nozzle holes, the air velocity V, the total nozzle hole cross-sectional area d per unit area, the total air amount f per unit area, the nozzle hole diameter R, and the number n of nozzle holes per unit area of the airflow ducts 431*a* to 431*c* in the respective example configurations will be shown in tables. The total nozzle hole cross-sectional area d per unit area is a value obtained by dividing the total nozzle hole cross-sectional area D of an airflow duct 431 by the area of the air blowing surface thereof. The total air amount f per unit area is a value obtained by dividing the total air amount F of an airflow duct 431 by the area of the air blowing surface thereof. The number n of nozzle holes per unit area is a value obtained by dividing the number N of nozzle holes of an airflow duct 431 by the area of the air blowing surface thereof. Note that, in the following example configurations, the air blowing surfaces of the airflow ducts 431 are equivalent in area.

Figure 11:
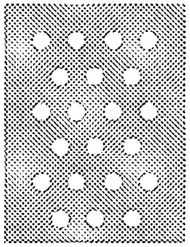
FIGS. 11-25 are tables showing example configurations according to one or more embodiments.
Figure 11:
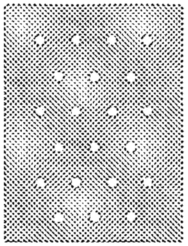
Figure 11:
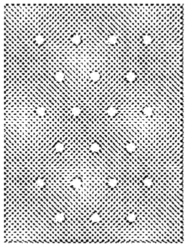

A first example configuration is shown in Table 1 (FIG. 11). In the first example configuration, the airflow duct 431*a* is set to a low air velocity V as the first airflow duct, the airflow duct 431*b* is set to a high air velocity V as the second airflow duct, and the airflow duct 431*c* is configured similarly to the airflow duct 431*b*. That is, the first example configuration is a configuration that is able to achieve improved efficiently of the drying operation while suppressing air blow streaking of the liquid composition on the sheet S.

As shown in Table 1, in Example Configuration 1, the relationship of the first air velocity VL of the airflow duct 431*a* and the second air velocity VH of the airflow duct 431*b* is VH=3.0VL. Also, the relationship of the first total cross-sectional area DL of the airflow duct 431*a* and the second total cross-sectional area DH of the airflow duct 431*b* is DL=3.0DH. Also, the relationship of the nozzle hole diameter RL of the airflow duct 431*a* and the nozzle hole diameter RH of the airflow duct 431*b* is RL=1.8RH. Also, the relationship of the number NL of nozzle holes of the airflow duct 431*a* and the number NH of nozzle holes of the airflow duct 431*b* is NL=1.0NH. Due to the parameters being set as described above, the relationship of the first total air amount FL of the airflow duct 431*a* and the second total air amount FH of the airflow duct 431*b* is FL=1.0FH, and the first total air amount FL and the second total air amount FH are substantially equivalent, and thus drying unevenness can be effectively suppressed.

Figure 12:
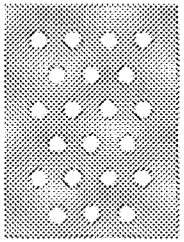
Figure 12:
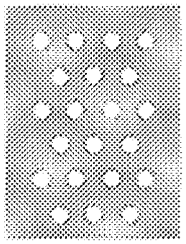
Figure 12:
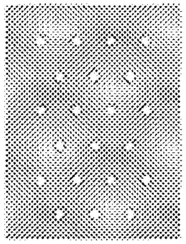

A second example configuration is shown in Table 2 (FIG. 12). In the second example configuration, the airflow duct 431*b* is set to a low air velocity V as the first airflow duct, the airflow duct 431*c* is set to a high air velocity V as the second airflow duct, and the airflow duct 431*a* is configured similarly to the airflow duct 431*b*. That is, the second example configuration is a configuration that is able to achieve improved efficiently of the drying operation while suppressing air blow streaking of the liquid composition on the sheet S.

As shown in Table 2, in Example Configuration 2, the relationship of the first air velocity VL of the airflow duct 431*b* and the second air velocity VH of the airflow duct 431*c* is VH=3.0VL. Also, the relationship of the first total cross-sectional area DL of the airflow duct 431*b* and the second total cross-sectional area DH of the airflow duct 431*c* is DL=3.0DH. Also, the relationship of the nozzle hole diameter RL of the airflow duct 431*b* and the nozzle hole diameter RH of the airflow duct 431*c* is RL=1.8RH. Also, the relationship of the number NL of nozzle holes of the airflow duct 431*b* and the number NH of nozzle holes of the airflow duct 431*c* is NL=1.0NH. Due to the parameters being set as described above, the relationship of the first total air amount FL of the airflow duct 431*b* and the second total air amount FH of the airflow duct 431*c* is FL=1.0FH, and the first total air amount FL and the second total air amount FH are substantially equivalent, and thus drying unevenness can be effectively suppressed.

Figure 13:
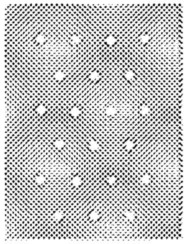
Figure 13:
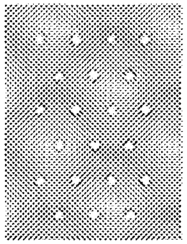
Figure 13:
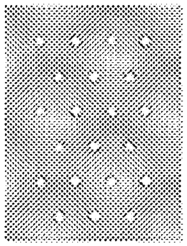

A third example configuration is shown in Table 3 (FIG. 13). In the third example configuration, the airflow duct 431*a* is set to a low air velocity V as the first airflow duct, the airflow duct 431*b* is set to a high air velocity V as the second airflow duct, and the airflow duct 431*c* is configured similarly to the airflow duct 431*b*. That is, the third example configuration is a configuration in which the drying operation can be improved while suppressing air blow streaking of the liquid composition on the sheet S.

As shown in Table 3, in Example Configuration 3, the relationship of the first air velocity VL of the airflow duct 431*a* and the second air velocity VH of the airflow duct 431*b* is VH=1.2VL. Also, the relationship of the first total cross-sectional area DL of the airflow duct 431*a* and the second total cross-sectional area DH of the airflow duct 431*b* is DL=1.3DH. Also, the relationship of the nozzle hole diameter RL of the airflow duct 431*a* and the nozzle hole diameter RH of the airflow duct 431*b* is RL=1.2RH. Also, the relationship of the number NL of nozzle holes of the airflow duct 431*a* and the number NH of nozzle holes of the airflow duct 431*b* is NL=1.0NH. Due to the parameters being set as described above, the relationship of the first total air amount FL of the airflow duct 431*a* and the second total air amount FH of the airflow duct 431*b* is FL=1.1FH, and the first total air amount FL and the second total air amount FH are substantially equivalent, and thus drying unevenness can be effectively suppressed.

Figure 14:
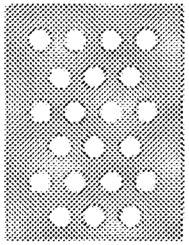
Figure 14:
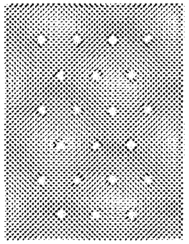
Figure 14:
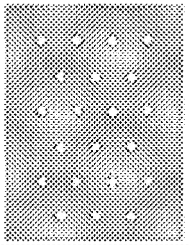

A fourth example configuration is shown in Table 4 (FIG. 14). In the fourth example configuration, the airflow duct 431*a* is set to a low air velocity V as the first airflow duct, the airflow duct 431*b* is set to a high air velocity V as the second airflow duct, and the airflow duct 431*c* is configured similarly to the airflow duct 431*b*. That is, the fourth example configuration is a configuration that is able to achieve improved efficiently of the drying operation while suppressing air blow streaking of the liquid composition on the sheet S.

As shown in Table 4, in Example Configuration 4, the relationship of the first air velocity VL of the airflow duct 431*a* and the second air velocity VH of the airflow duct 431*b* is VH=3.0VL. Also, the relationship of the first total cross-sectional area DL of the airflow duct 431*a* and the second total cross-sectional area DH of the airflow duct 431*b* is DL=4.4DH. Also, the relationship of the nozzle hole diameter RL of the airflow duct 431*a* and the nozzle hole diameter RH of the airflow duct 431*b* is RL=2.1RH. Also, the relationship of the number NL of nozzle holes of the airflow duct 431*a* and the number NH of nozzle holes of the airflow duct 431*b* is NL=1.0NH. Due to the parameters being set as described above, the relationship of the first total air amount FL of the airflow duct 431*a* and the second total air amount FH of the airflow duct 431*b* is FL=1.48FH. Even with such a configuration, the ratio of the first total air amount FL of the airflow duct 431*a* and the second total air amount FH of the airflow duct 431*b* is within the predetermined range, and thus the effect of suppressing drying unevenness can be obtained, compared with a configuration that does not satisfy the above-described expression (3).

Figure 15:
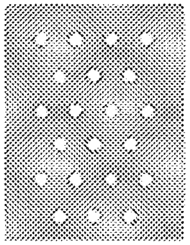
Figure 15:
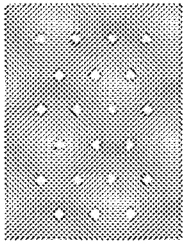
Figure 15:
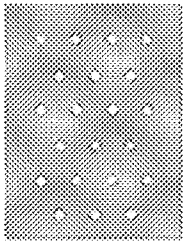

A fifth example configuration is shown in Table 5 (FIG. 15). In the fifth example configuration, the airflow duct 431*a* is set to a low air velocity V as the first airflow duct, the airflow duct 431*b* is set to a high air velocity V as the second airflow duct, and the airflow duct 431*c* is configured similarly to the airflow duct 431*b*. That is, the fifth example configuration is a configuration that is able to achieve improved efficiently of the drying operation while suppressing air blow streaking of the liquid composition on the sheet S.

As shown in Table 5, in Example Configuration 5, the relationship of the first air velocity VL of the airflow duct 431*a* and the second air velocity VH of the airflow duct 431*b* is VH=1.2VL. Also, the relationship of the first total cross-sectional area DL of the airflow duct 431*a* and the second total cross-sectional area DH of the airflow duct 431*b* is DL=1.7DH. Also, the relationship of the nozzle hole diameter RL of the airflow duct 431*a* and the nozzle hole diameter RH of the airflow duct 431*b* is RL=1.3RH. Also, the relationship of the number NL of nozzle holes of the airflow duct 431*a* and the number NH of nozzle holes of the airflow duct 431*b* is NL=1.0NH. Due to the parameters being set as described above, the relationship of the first total air amount FL of the airflow duct 431*a* and the second total air amount FH of the airflow duct 431*b* is FL=1.42FH. Even with such a configuration, the ratio of the first total air amount FL of the airflow duct 431*a* and the second total air amount FH of the airflow duct 431*b* is within the predetermined range, and thus the effect of suppressing drying unevenness can be obtained, compared with a configuration that does not satisfy the above-described expression (3).

Figure 16:
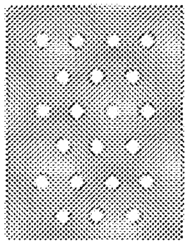
Figure 16:
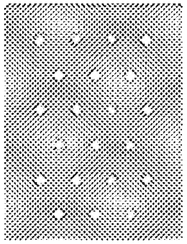
Figure 16:
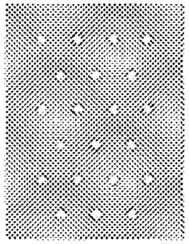

A sixth example configuration is shown in Table 6 (FIG. 16). In the sixth example configuration, the airflow duct 431*a* is set to a low air velocity V as the first airflow duct, the airflow duct 431*b* is set to a high air velocity V as the second airflow duct, and the airflow duct 431*c* is configured similarly to the airflow duct 431*b*. That is, the sixth example configuration is a configuration that is able to achieve improved efficiently of the drying operation while suppressing air blow streaking of the liquid composition on the sheet S.

As shown in Table 6, in Example Configuration 6, the relationship of the first air velocity VL of the airflow duct 431*a* and the second air velocity VH of the airflow duct 431*b* is VH=3.0VL. Also, the relationship of the first total cross-sectional area DL of the airflow duct 431*a* and the second total cross-sectional area DH of the airflow duct 431*b* is DL=2.0DH. Also, the relationship of the nozzle hole diameter RL of the airflow duct 431*a* and the nozzle hole diameter RH of the airflow duct 431*b* is RL=1.4RH. Also, the relationship of the number NL of nozzle holes of the airflow duct 431*a* and the number NH of nozzle holes of the airflow duct 431*b* is NL=1.0NH. Due to the parameters being set as described above, the relationship of the first total air amount FL of the airflow duct 431*a* and the second total air amount FH of the airflow duct 431*b* is FL=0.66FH. Even with such a configuration, the ratio of the first total air amount FL of the airflow duct 431*a* and the second total air amount FH of the airflow duct 431*b* is within the predetermined range, and thus the effect of suppressing drying unevenness can be obtained, compared with a configuration that does not satisfy the above-described expression (3).

Figure 17:
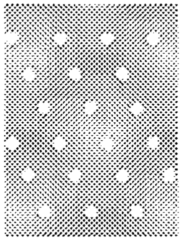
Figure 17:
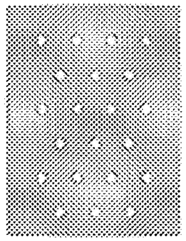
Figure 17:
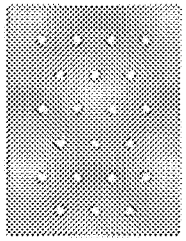

A seventh example configuration is shown in Table 7 (FIG. 17). In the seventh example configuration, the airflow duct 431*a* is set to a low air velocity V as the first airflow duct, the airflow duct 431*b* is set to a high air velocity V as the second airflow duct, and the airflow duct 431*c* is configured similarly to the airflow duct 431*b*. That is, the seventh example configuration is a configuration that is able to achieve improved efficiently of the drying operation while suppressing air blow streaking of the liquid composition on the sheet S.

As shown in Table 7, Example Configuration 7 is a configuration in which the nozzle pattern of the airflow duct 431*a* is changed with respect to Example Configuration 1. In the airflow duct 431*a* of Example Configuration 7, A=1.0, and the plurality of nozzle holes are disposed, with pitch X in the width direction of sheet S=nozzle hole diameter×1.0. Also, in the airflow ducts 431*b* and 431*c*, the nozzle holes are spaced constantly in the conveyance direction of the sheet S and in the width direction of the sheet S. According to such a configuration, drying efficiency can be improved while suppressing drying unevenness and also suppressing printing unevenness caused by the disposition configuration of the nozzle holes. Note that, in application of the present invention, a configuration may be adopted in which only the airflow duct 431*a* is constituted as described above, or only the airflow ducts 431*b* and 431*c* are constituted as described above. Also, the airflow duct 431*b* may be constituted with a similar nozzle hole disposition configuration to the airflow duct 431*a*.

Figure 18:
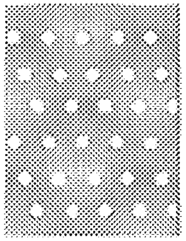
Figure 18:
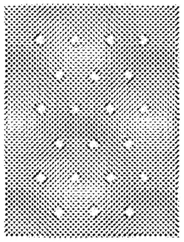
Figure 18:
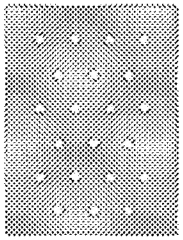

An eighth example configuration is shown in Table 8 (FIG. 18). In the eighth example configuration, the airflow duct 431*a* is set to a low air velocity V as the first airflow duct, the airflow duct 431*b* is set to a high air velocity V as the second airflow duct, and the airflow duct 431*c* is configured similarly to the airflow duct 431*b*. That is, the eighth example configuration is a configuration that is able to achieve improved efficiently of the drying operation while suppressing air blow streaking of the liquid composition on the sheet S.

As shown in Table 8, Example Configuration 8 is a configuration in which the nozzle pattern of the airflow duct 431*a* is changed with respect to Example Configuration 7. In the airflow duct 431*a* of Example Configuration 8, A=0.8, and the plurality of nozzle holes are disposed, with pitch X in the width direction of sheet S=nozzle hole diameter×0.8. Also, in the airflow ducts 431*b* and 431*c*, the nozzle holes are spaced constantly in the conveyance direction of the sheet S and in the width direction of the sheet S. According to such a configuration, drying efficiency can be improved while suppressing drying unevenness and also suppressing printing unevenness caused by the disposition configuration of the nozzle holes.

Figure 19:
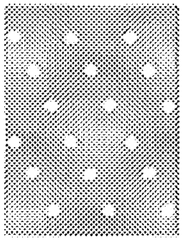
Figure 19:
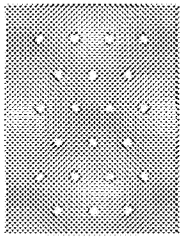
Figure 19:
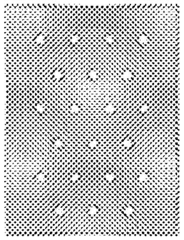

A ninth example configuration is shown in Table 9 (FIG. 19). In the ninth example configuration, the airflow duct 431*a* is set to a low air velocity V as the first airflow duct, the airflow duct 431*b* is set to a high air velocity V as the second airflow duct, and the airflow duct 431*c* is configured similarly to the airflow duct 431*b*. That is, the ninth example configuration is a configuration that is able to achieve improved efficiently of the drying operation while suppressing air blow streaking of the liquid composition on the sheet S.

As shown in Table 9, Example Configuration 9 is a configuration in which the nozzle pattern of the airflow duct 431*a* is changed with respect to Example Configuration 7. In the airflow duct 431*a* of Example Configuration 9, A=1.3, and the plurality of nozzle holes are disposed, with pitch X in the width direction of sheet S=nozzle hole diameter×1.3. Also, in the airflow ducts 431*b* and 431*c*, the nozzle holes are spaced constantly in the conveyance direction of the sheet S and in the width direction of the sheet S. According to such a configuration, drying efficiency can be improved while suppressing drying unevenness and also suppressing printing unevenness caused by the disposition configuration of the nozzle holes.

Control of Drying Portion 40

Next, the control procedure of the drying portion 40 that is implemented by the control portion 21 will be described. Upon recording data being transmitted from the host apparatus 25 to the control portion 21, a preparation operation for recording by the recording apparatus 1 is started.

The control portion 21 determines drive table values of the drying portion 40, based on recording conditions. The conditions of the drive table are determined, based on the type and recording density of the recording medium and user-designated values. The airflow temperature of each airflow duct 431 and the drive DUTY of the air blowing source are designated, according to the conditions. DUTY is intended to as a drive pulse duty cycle of the air blowing source, and outputs a drive signal between stop 0% to full speed 100%. Note that, in the first embodiment, the air amount of each airflow duct 431 is adjusted by the drive DUTY of the air blowing source, but air amount adjustment is not limited this means. For example, a configuration may be adopted in which nozzle pressure detection means not shown is provided within each airflow duct, the pressure value within the nozzles is set as a target value, and the air amount is adjusted by feedback control of the air blowing source based on the detected pressure value.

In the second airflow space 430, with regard to two airflow ducts 431 adjacent in the conveyance direction of the recording medium and having different air velocities, the drive DUTY of the airflow ducts 431 is controlled, such that the total air amounts of the respective airflow ducts 431 are equivalent.

More specifically, with regard to the first air velocity VL of the first airflow duct having a low air velocity and the second air velocity VH of the second airflow duct having a high air velocity, the drive DUTY of each airflow duct 431 is controlled so as to satisfy $1.2VL \leq VH \leq 3.0VL$. At the same time, with regard to the first total air amount FL of the first airflow duct and the second total air amount FH of the second airflow duct, the drive DUTY of each airflow duct 431 is controlled so as to satisfies FH:FL=2:3 to 3:2.

As a result of the configuration and operations described above, the drying portion 40 is able to suppress air blow streaking of the liquid composition and deterioration of drying efficiency, and is also able to maintain a favorable drying process by suppressing the occurrence of unevenness due to crossflow and nozzle disposition.

Second Embodiment

Next, a second embodiment according to the present invention will be described. In the second embodiment, the method of setting the number of nozzle holes in the airflow ducts 431 differs from the first embodiment. Hereinafter, in the description of the second embodiment, the same reference numerals are given to configuration that is similar to the first embodiment and description thereof will be omitted, and only configuration characteristic to the second embodiment will be described.

In the first embodiment, in order to configure the total air amounts F to an equivalent level, after having provided a difference in the air velocities V of two airflow ducts 431 adjacent to each other in the conveyance direction of the sheet S, the diameter and number of the nozzle holes of the respective airflow ducts 431 are differentiated. However, in order to configure the total air amounts of the two airflow ducts 431 having different air velocities to an equivalent level, a large difference may be provided in the number N of nozzle holes, after having configured the nozzle hole diameters R to be equivalent. Hereinafter, as the second embodiment, a configuration will be described in which the nozzle hole diameters R of the plurality of airflow ducts 431 are the same as each other and a large difference is provided in the number N of nozzle holes compared to the first embodiment.

In the second embodiment, with regard to the number NL of first nozzle holes of the first airflow duct having a low air velocity and the number NH of second nozzle holes of the second airflow duct having a high air velocity, nozzle design is favorably performed so as to satisfy the following expression (7).

$$NH < NL \leq 4.5NH \tag{7}$$

Such a configuration is particularly favorable for a configuration in which the nozzle hole diameter R of all of the airflow ducts 431 is small (e.g., 2.0 mm or less) and the density of the nozzle holes in the air blowing surface is not readily increased even by increasing the number N of nozzle holes. This is because in the case where the density of the nozzle hole is excessively high, air is not readily expelled from the space between the sheet S and the airflow ducts 431, possibly resulting in deterioration of fuel efficiency.

In addition to the expressions (1) to (3) described in the first embodiment, the total air amounts F of the respective airflow ducts 431 can be controlled to an equivalent level, by configuring and controlling the airflow ducts 431 so as to satisfy the above-described expression (6). Consequently, according to the configuration of the second embodiment, drying unevenness can be suppressed while suppressing air blow streaking of the liquid composition and deterioration of drying efficiency.

Next, specific example configurations according to the second embodiment of the instant invention will be illustratively described. Hereinafter, as example configurations, a plurality of combinations of nozzle hole patterns and air velocities V for obtaining the effect of suppressing air blow streaking of the liquid composition and the effect of suppressing drying unevenness will be shown. Note that, in the following example configurations, the air blowing surfaces of the airflow ducts 431 are equivalent in area.

Figure 20:
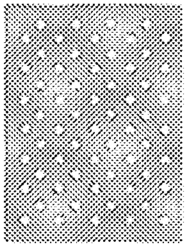
Figure 20:
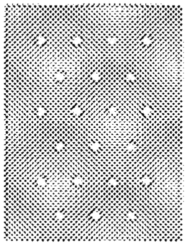
Figure 20:
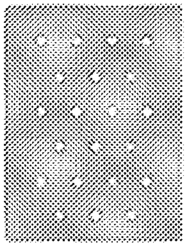

A tenth example configuration is shown in Table 10 (FIG. 20). In the tenth example configuration, the airflow duct 431_a_ is set to a low air velocity V as the first airflow duct, the airflow duct 431_b_ is set to a high air velocity V as the second airflow duct, and the airflow duct 431_c_ is configured similarly to the airflow duct 431_b_. That is, the tenth example configuration is a configuration that is able to achieve improved efficiently of the drying operation while suppressing air blow streaking of the liquid composition on the sheet S.

As shown in Table 10, in Example Configuration 10, the relationship of the first air velocity VL of the airflow duct 431_a_ and the second air velocity VH of the airflow duct 431_b_ is VH=3.0VL. Also, the relationship of the first total cross-sectional area DL of the airflow duct 431_a_ and the second total cross-sectional area DH of the airflow duct 431_b_ is DL=3.0DH. Also, the nozzle hole diameter RL of the airflow duct 431_a_ and the nozzle hole diameter RH of the airflow duct 431_b_ are the same at 2.0 mm. Also, relationship of the number NL of nozzle holes of the airflow duct 431_a_ and the number NH of nozzle holes of the airflow duct 431_b_ is NL=3.0NH. Due to the parameters being set as described above, the relationship of the first total air amount FL of the airflow duct 431_a_ and the second total air amount FH of the airflow duct 431_b_ is FL=1.0FH, and the first total air amount FL and the second total air amount FH are substantially equivalent, and thus drying unevenness can be effectively suppressed.

Figure 21:
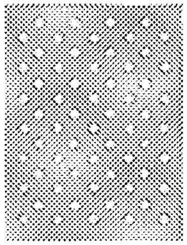
Figure 21:
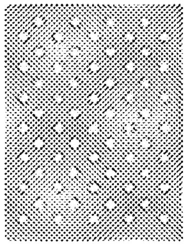
Figure 21:
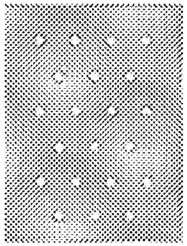

An eleventh example configuration is shown in Table 11 (FIG. 21). In the eleventh example configuration, the airflow duct 431_b_ is set to a low air velocity V as the first airflow duct, the airflow duct 431_c_ is set to a high air velocity V as the second airflow duct, and the airflow duct 431_a_ is configured similarly to the airflow duct 431_b_. That is, the eleventh example configuration is a configuration that is able to achieve improved efficiently of the drying operation while suppressing air blow streaking of the liquid composition on the sheet S.

As shown in Table 11, in Example Configuration 11, the relationship of the first air velocity VL of the airflow duct 431_b_ and the second air velocity VH of the airflow duct 431_c_ is VH=3.0VL. Also, the relationship of the first total cross-sectional area DL of the airflow duct 431_b_ and the second total cross-sectional area DH of the airflow duct 431_c_ is DL=3.0DH. Also, the nozzle hole diameter RL of the airflow duct 431_b_ and the nozzle hole diameter RH of the airflow duct 431_c_ are the same at 2.0 mm. Also, the relationship of the number NL of nozzle holes of the airflow duct 431_b_ and the number NH of nozzle holes of the airflow duct 431_c_ is NL=3.0NH. Due to the parameters being set as described above, the relationship of the first total air amount FL of the airflow duct 431_b_ and the second total air amount FH of the airflow duct 431_c_ is FL=1.0FH, and the first total air amount FL and the second total air amount FH are substantially equivalent, and thus drying unevenness can be effectively suppressed.

Figure 22:
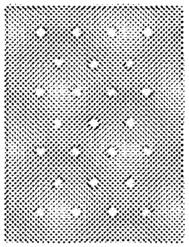
Figure 22:
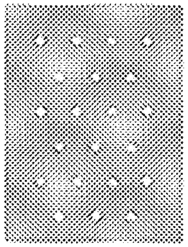
Figure 22:
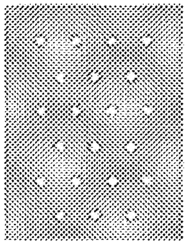

A twelfth example configuration is shown in Table 12 (FIG. 22). In the twelfth example configuration, the airflow duct 431_a_ is set to a low air velocity V as the first airflow duct, the airflow duct 431_b_ is set to a high air velocity V as the second airflow duct, and the airflow duct 431_c_ is configured similarly to the airflow duct 431_b_. That is, the twelfth example configuration is a configuration that is able to achieve improved efficiently of the drying operation while suppressing air blow streaking of the liquid composition on the sheet S.

As shown in Table 12, in Example Configuration 12, the relationship of the first air velocity VL of the airflow duct 431_a_ and the second air velocity VH of the airflow duct 431_b_ is VH=1.2VL. Also, the relationship of the first total cross-sectional area DL of the airflow duct 431_a_ and the second total cross-sectional area DH of the airflow duct 431_b_ is DL=1.1DH. Also, the nozzle hole diameter RL of the airflow duct 431_a_ and the nozzle hole diameter RH of the airflow duct 431_b_ are the same at 2.0 mm. Also, the relationship of the number NL of nozzle holes of the airflow duct 431_a_ and the number NH of nozzle holes of the airflow duct 431_b_ is NL=1.2NH. Due to the parameters being set as described above, the relationship of the first total air amount FL of the airflow duct 431_a_ and the second total air amount FH of the airflow duct 431_b_ is FL=1.0FH, and the first total air amount FL and the second total air amount FH are substantially equivalent, and thus drying unevenness can be effectively suppressed.

Figure 23:
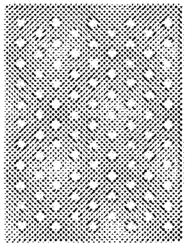
Figure 23:
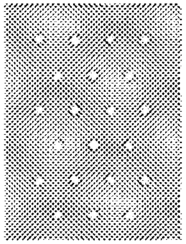
Figure 23:
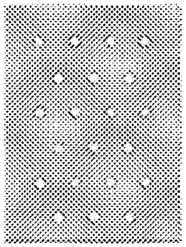

A thirteenth example configuration is shown in Table 13 (FIG. 23). In the thirteenth example configuration, the airflow duct 431_a_ is set to a low air velocity V as the first airflow duct, the airflow duct 431_b_ is set to a high air velocity V as the second airflow duct, and the airflow duct 431_c_ is configured similarly to the airflow duct 431_b_. That is, the thirteenth example configuration is a configuration in which the efficiency of the drying operation can be improved while suppressing air blow streaking of the liquid composition on the sheet S.

As shown in Table 13, in Example Configuration 13, the relationship of the first air velocity VL of the airflow duct 431_a_ and the second air velocity VH of the airflow duct 431_b_ is VH=3.0VL. Also, the relationship of the first total cross-sectional area DL of the airflow duct 431_a_ and the second total cross-sectional area DH of the airflow duct 431_b_ is DL=4.5DH. Also, the nozzle hole diameter RL of the airflow duct 431_a_ and the nozzle hole diameter RH of the airflow duct 431_b_ are the same at 2.0 mm. Also, the relationship of the number NL of nozzle holes of the airflow duct 431_a_ and the number NH of nozzle holes of the airflow duct 431_b_ is NL=4.5NH. Due to the parameters being set as described above, the relationship of the first total air amount FL of the airflow duct 431_a_ and the second total air amount FH of the airflow duct 431_b_ is FL=1.49FH. Even with such a configuration, the ratio of the first total air amount FL of the airflow duct 431_a_ and the second total air amount FH of the airflow duct 431_b_ is within the predetermined range, and thus the effect of suppressing drying unevenness can be obtained, compared with a configuration that does not satisfy the above-described expression (3).

Figure 24:
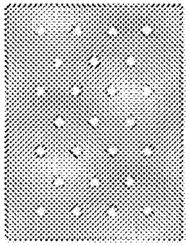
Figure 24:
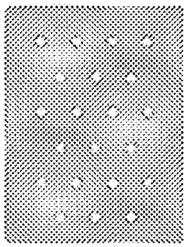
Figure 24:
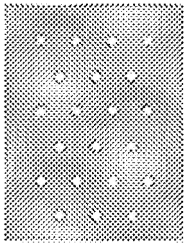

Table 14 (FIG. 24) shows a fourteenth example configuration. In the fourteenth example configuration, the airflow duct 431_a_ is set to a low air velocity V as the first airflow duct, the airflow duct 431_b_ is set to a high air velocity V as the second airflow duct, and the airflow duct 431_c_ is configured similarly to the airflow duct 431_b_. That is, the fourteenth example configuration is a configuration that is able to achieve improved efficiently of the drying operation while suppressing air blow streaking of the liquid composition on the sheet S.

As shown in Table 14, in Example Configuration 14, the relationship of the first air velocity VL of the airflow duct 431_a_ and the second air velocity VH of the airflow duct 431_b_ is VH=1.2VL. Also, the relationship of the first total cross-sectional area DL of the airflow duct 431_a_ and the second total cross-sectional area DH of the airflow duct 431_b_ is DL=1.7DH. Also, the nozzle hole diameter RL of the airflow duct 431_a_ and the nozzle hole diameter RH of the airflow duct 431_b_ are the same at 2.0 mm. Also, the relationship of the number NL of nozzle holes of the airflow duct 431_a_ and the number NH of nozzle holes of the airflow duct 431_b_ is NL=1.7NH. Due to the parameters being set as described above, the relationship of the first total air amount FL of the airflow duct 431_a_ and the second total air amount FH of the airflow duct 431_b_ is FL=0.58FH. Even with such a configuration, the ratio of the first total air amount FL of the airflow duct 431_a_ and the second total air amount FH of the airflow duct 431_b_ is within the predetermined range, and thus the effect of suppressing drying unevenness can be obtained, compared with a configuration that does not satisfy the above-described expression (3).

Figure 25:
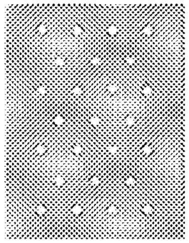
Figure 25:
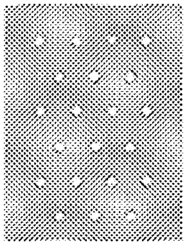
Figure 25:
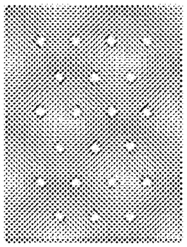

Table 15 (FIG. 25) shows a fifteenth example configuration. In the fifteenth example configuration, the airflow duct 431_a_ is set to a low air velocity V as the first airflow duct, the airflow duct 431_b_ is set to a high air velocity V as the second airflow duct, and the airflow duct 431_c_ is configured similarly to the airflow duct 431_b_. That is, the fifteenth example configuration is a configuration that is able to achieve improved efficiently of the drying operation while suppressing air blow streaking of the liquid composition on the sheet S.

As shown in Table 15, in Example Configuration 15, the relationship of the first air velocity VL of the airflow duct 431_a_ and the second air velocity VH of the airflow duct 431_b_ is VH=3.0VL. Also, the relationship of the first total cross-sectional area DL of the airflow duct 431_a_ and the second total cross-sectional area DH of the airflow duct 431_b_ is DL=2.1DH. Also, the nozzle hole diameter RL of the airflow duct 431_a_ and the nozzle hole diameter RH of the airflow duct 431_b_ are the same at 2.0 mm. Also, the relationship of the number NL of nozzle holes of the airflow duct 431_a_ and the number NH of nozzle holes of the airflow duct 431_b_ is NL=2.0NH. Due to the parameters being set as described above, the relationship of the first total air amount FL of the airflow duct 431_a_ and the second total air amount FH of the airflow duct 431_b_ is FL=0.68FH. Even with such a configuration, the ratio of the first total air amount FL of the airflow duct 431_a_ and the second total air amount FH of the airflow duct 431_b_ is within the predetermined range, and thus the effect of suppressing drying unevenness can be obtained, compared with a configuration that does not satisfy the above-described expression (3).

Other Embodiments

Note that the configuration of the above-described recording apparatus 1 and control method of the drying portion 40 are merely examples of the present invention in all respects, and the present invention is not limited to the above-described embodiments. Also, the configurations of the above-described embodiments are not all necessarily required in application of the present invention.

Also, execution of processing described as being performed by one apparatus may be shared between a plurality of apparatuses. Alternatively, processing described as being performed by different apparatuses may be executed by one apparatus. In a computer system, the hardware configuration for realizing the respective functions can be flexibly changed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-091752, filed on Jun. 2, 2023, which is hereby incorporated by reference herein in its entirety.

What is claimed is:

1. A recording apparatus comprising:

a recording portion configured to apply a liquid composition to a recording medium and record an image;

a first air blowing portion having a plurality of first nozzle holes of which a total cross-sectional area is a first total cross-sectional area, and configured to blow air toward the recording medium through the plurality of first nozzle holes;

a second air blowing portion having a plurality of second nozzle holes of which a total cross-sectional area is a second total cross-sectional area smaller than the first total cross-sectional area, and configured to blow air toward the recording medium through the plurality of second nozzle holes, and moreover provided within a same space as the first air blowing portion so as to be adjacent to the first air blowing portion on a downstream side in a conveyance direction of the recording medium; and a control portion configured to control the first air blowing portion and the second air blowing portion such that a first air velocity in the plurality of first nozzle holes of the first air blowing portion is lower than a second air velocity in the plurality of second nozzle holes of the second air blowing portion, and a ratio of a first total air amount, which is a total air amount per unit time blown from the plurality of first nozzle holes, and a second total air amount, which is a total air amount per unit time blown from the plurality of second nozzle holes, is within a predetermined range, wherein $1.2DH<DL<3.ODH$ is satisfied, where DL is the first total cross-sectional area and DH is the second total cross-sectional area, and wherein the control portion controls the first air blowing portion and the second air blowing portion so as to satisfy $1.2VL<VH<3.OVL$ and FH:FL=2:3 to 3:2, where VL is the first air velocity, VH is the second air velocity, FL is the first total air amount, and FH is the second total air amount.

2. The recording apparatus according to claim 1, wherein the control portion controls the first air blowing portion and the second air blowing portion such that FH:FL=1:1 is satisfied.

3. The recording apparatus according to claim 1, wherein a first nozzle hole diameter of the plurality of first nozzle holes is larger than a second nozzle hole diameter of the plurality of second nozzle holes.

4. The recording apparatus according to claim 3, wherein $RH<RL\leq 2.4RH$ is satisfied, where RL is the first nozzle hole diameter and RH is the second nozzle hole diameter.

5. The recording apparatus according to claim 4, wherein $0.8NH\leq NL\leq 1.2NH$ is satisfied, where NL is a number of first nozzle holes provided in the first air blowing portion, and NH is a number of second nozzle holes provided in the second air blowing portion.

6. The recording apparatus according to claim 1, wherein a nozzle hole diameter of the plurality of first nozzle holes is 2.0 mm or less, and wherein $NH<NL\leq 4.5NH$ is satisfied, where NL is a number of first nozzle holes provided in the first air blowing portion, and NH is a number of second nozzle holes provided in the second air blowing portion.

7. The recording apparatus according to claim 1, wherein the first air blowing portion is a first airflow duct provided with the plurality of first nozzle holes, and the second air blowing portion is a second airflow duct provided with the plurality of second nozzle holes, and wherein a distance in the conveyance direction between an outer covering of the first airflow duct and an outer covering of the second airflow duct is 50 mm or less.

8. The recording apparatus according to claim 1, wherein the first air blowing portion is a first airflow duct having an air blowing surface in which the plurality of first nozzle holes are provided, and the second air blowing portion is a second airflow duct having an air blowing surface in which the plurality of second nozzle holes are provided, and wherein a distance between the air blowing surface of the first airflow duct and the recording medium and a distance between the air blowing surface of the second airflow duct and the recording medium are 30 mm or less.

9. The recording apparatus according to claim 1, wherein $X=RL\times A$, and the A satisfies $0.8\leq A\leq 1.3$, where RL is a first nozzle hole diameter of the plurality of first nozzle holes, and X is a pitch of the plurality of first nozzle holes of the first air blowing portion in a width direction orthogonal to the conveyance direction.

10. The recording apparatus according to claim 9, wherein a disposition spacing of the plurality of second nozzle holes in the conveyance direction and a disposition spacing of the plurality of second nozzle holes in the width direction are constant.

11. The recording apparatus according to claim 1, further comprising:

an air circulation portion configured to collect air of a space in which the first air blowing portion and the second air blowing portion are provided, and supply the air toward the first air blowing portion and the second air blowing portion.

12. The recording apparatus according to claim 11, wherein the air circulation portion includes a heater configured to heat the air to be supplied to the first air blowing portion and a heater configured to heat the air to be supplied to the second air blowing portion.

13. A drying method for a recording apparatus that blows air toward a recording medium with the recording apparatus and dries the recording medium, the recording apparatus including a recording portion configured to apply a liquid composition to the recording medium and record an image, a first air blowing portion having a plurality of first nozzle holes of which a total cross-sectional area is a first total cross-sectional area and configured to blow air toward the recording medium through the plurality of first nozzle holes, and a second air blowing portion having a plurality of second nozzle holes of which total cross-sectional area is a second total cross-sectional area smaller than the first total cross-sectional area, and configured to blow air toward the recording medium through the plurality of second nozzle holes and moreover provided within a same space as the first air blowing portion so as to be adjacent to the first air blowing portion on a downstream side in a conveyance direction of the recording medium, the method comprising:

blowing air toward the recording medium from the first air blowing portion and the second air blowing portion such that a first air velocity in the plurality of first nozzle holes of the first air blowing portion is lower than a second air velocity in the plurality of second nozzle holes of the second air blowing portion, and a ratio of a first total air amount, which is a total air amount per unit time blown from the plurality of first nozzle holes, and a second total air amount, which is a total air amount per unit time blown from the plurality of second nozzle holes, is within a predetermined range, wherein $1.2DH<DL<3.ODH$ is satisfied, where DL is the first total cross-sectional area and DH is the second total cross-sectional area, and wherein the method includes blowing air toward the recording medium from the first air blowing portion and the second air blowing portion so as to satisfy $1.2VL<VH<3.0VL$ and $FH:FL=2:3$ to $3:2$, where VL is the first air velocity, VH is the second air velocity, FL is the first total air amount, and FH is the second total air amount.

* * * * *